United States Patent [19]
Heebner

[11] Patent Number: 5,605,944
[45] Date of Patent: Feb. 25, 1997

[54] HEAT-RESISTANT ADHESIVE FOR USE ESPECIALLY IN MAKING STERILIZABLE PACKAGING

[75] Inventor: Gerald W. Heebner, Savannah, Ga.

[73] Assignee: Union Camp Corporation, Wayne, N.J.

[21] Appl. No.: 430,056

[22] Filed: Apr. 27, 1995

[51] Int. Cl.$^6$ .............................. C08K 3/20; C08L 63/02
[52] U.S. Cl. ........................................... 523/404; 525/430
[58] Field of Search ............................ 523/404; 525/430

[56] References Cited

U.S. PATENT DOCUMENTS

| | | | |
|---|---|---|---|
| 2,705,223 | 3/1955 | Renfrew et al. | 260/18 |
| 2,707,708 | 5/1955 | Wittcoff | 260/18 |
| 2,811,495 | 10/1957 | Wittcoff et al. | 260/18 |
| 2,867,592 | 1/1959 | Morris et al. | 260/18 |
| 2,881,194 | 4/1959 | Peerman et al. | 260/404.5 |
| 2,890,184 | 6/1959 | Foerster | 260/18 |
| 2,899,397 | 8/1959 | Aelony et al. | 260/18 |
| 2,930,773 | 3/1960 | Renfrew et al. | 260/18 |
| 2,999,826 | 9/1961 | Peerman et al. | 260/18 |
| 3,062,773 | 11/1962 | Rogier | 260/42 |
| 3,488,665 | 1/1970 | MacGrandle et al. | 12/146 |
| 3,945,964 | 3/1976 | Hastings et al. | 260/29.6 NR |
| 4,082,708 | 4/1978 | Mehta | 260/18 N |
| 5,025,043 | 6/1991 | Smith | 523/326 |
| 5,095,058 | 3/1992 | Smith et al. | 524/238 |
| 5,296,557 | 3/1994 | Frihart | 525/423 |
| 5,428,083 | 6/1995 | Smith et al. | 523/414 |

FOREIGN PATENT DOCUMENTS

| | | |
|---|---|---|
| 0157478 | 9/1985 | European Pat. Off. . |
| WO92/16579 | 1/1992 | WIPO . |
| WO92/19677 | 12/1992 | WIPO . |

OTHER PUBLICATIONS

Odian, G., "Principles of Polymerization", John Wiley & Sons, 1981, pp. 33–36, 135–136.

Skeist, I., ed., "Handbook of Adhesives", Van Nostrand Reinhold Company, New York, 1977, pp. 581–584, 587–590, 434–439.

Wake, W., "Adhesion and the Formulation of Adhesives", Applied Science Publishers, London, 2nd Edition, 1982, pp. 267–280.

*Primary Examiner*—Melvyn I. Marquis
*Assistant Examiner*—D. Aylward
*Attorney, Agent, or Firm*—Woodcock Washburn Kurtz Mackiewicz & Norris

[57] ABSTRACT

Polyamide/epoxy, thermoplastic-thermoset curable adhesive resin systems which are aqueous dispersions are disclosed; wherein the epoxy resin component has unreacted epoxy groups numbering, on average, between about 2 and about 8; the polyamide component comprises both an acid terminated polyamide resin having an acid number, on average, of from about 10 to about 30, in an amount of from about 20% to about 60% by weight of the total weight of polyamide resin, and an amine terminated polyamide resin having an amine number, on average, of from about 5 to about 30, in an amount of from about 80% to about 40% by weight of the total weight of polyamide resin; and additionally a neutralizing base in amount sufficient to neutralize from about 50% to about 80%, on an equivalents basis, of the total number of free acid groups occurring on the acid and amine terminated polyamide resin components; and optionally at least one water soluble, dipolar chemical moiety in an amount effective to provide stability in the overall resin composition; and optionally a surfactant. The disclosed adhesive resin systems exhibit stability to separation, premature curing or significant reaction at room temperature for at least six months, and are capable of forming an adhesive bond at elevated temperatures which, once formed, will maintain its integrity under the high temperature, pressure and moisture conditions of autoclave sterilization. They find particular application in producing packaging containers for enclosing and isolating an object to be sterilized, e.g., a surgical instrument.

27 Claims, No Drawings

HEAT-RESISTANT ADHESIVE FOR USE ESPECIALLY IN MAKING STERILIZABLE PACKAGING

BACKGROUND OF THE INVENTION

1. Field of the Invention

The adhesive resin systems of the present invention are in the field of curable thermoplastic-thermoset adhesives based on polyamide resins in combination with epoxy resins. The present invention is also in the field of adhesive resin formulations which are particularly tailored to meet specific application needs, which in the case at hand is for use in making packaging which is sterilizable.

2. Brief Description of the Prior Art

Dimer-based polyamides useful for curing epoxy resins are known, as described, e.g., in U.S. Pat. Nos. 3,062,773 (Rogier); 2,999,826 (Peerman et al.); 2,930,773 (Renfrew et al.); 2,890,184 (Foerster); 2,881,194 (Peerman et al.); and 2,707,708 (Wittcoff). However, the polyamides disclosed in these references are not solids at ambient temperatures, but are liquids having a high amine number. The liquid polyamides are mixed with liquid epoxies and allowed to cure. The products possess little cohesive strength until sufficient curing occurs. While certain of the cured products may be useful as adhesives, they suffer from the shortcomings of being usually rigid and having limited ductility.

It is also known to blend a thermoplastic polyamide with an epoxy resin to produce an adhesive, e.g., as disclosed in U.S. Pat. No. 2,867,592 (Morris et al.). However, the amount of epoxy resin added is limited to a proportion effective to link small numbers of polyamide resin molecules together without providing sufficient cross linking to cause curing. Thus, such a blend is not a thermoset and is not capable of being cured to an infusible final product.

U.S. Pat. No. 3,488,665 (MacGrandle et al.) teaches a process wherein polyamides are blended with epoxies to provide a product which cures after application to the substrate; however, the product is used to provide a hard, stiff coating for flexible sheet material. Curable adhesives have been made using polyamide resins and epoxy resins as in U.S. Pat. No. 2,705,223 (Renfrew et al.). But the Renfrew compositions possess inferior properties when applied as adhesives. For example, the Renfrew compositions do not possess good adhesive strength upon cure and provide limited working time after the mixing of the components. In addition, such compositions exhibit poor flexibility, and poor adhesive resistance to heat, water and organic solvents when applied to substrates at ambient temperature.

U.S. Pat. No. 4,082,708 (Mehta) teaches an adhesive system comprising an epoxy resin and a polyamide wherein the polyamide is derived substantially from primary and tertiary amines; specifically, the Mehta polyamides are derived from 1,4-bis-primary amino lower alkyl piperazines having terminal primary amine groups. Although it is suggested that secondary amines can be utilized in making the polyamides as chain extenders and flexibilizers, it is taught that the secondary amines are less desirable reactants and should be buried within the polyamide structure.

European Patent Application Publication No. EP 0 157 478 describes adhesive compositions prepared by mixing solid particles of polyamide resins with solid particles of epoxy resins. If desired, the composition also contains a polymeric binder. Prior to application as an adhesive, the polyamide and epoxy composition is preferably dispersed in a non-solvent.

Hastings et al., U.S. Pat. No. 3,945,964 describes stable aqueous emulsions of epoxy resins containing, as emulsifying agents, ethylene oxide/propylene oxide block polymers of specified formulae. Curing agents described as useful with the epoxy resin emulsion include polyamides.

Aelony et al., U.S. Pat. No. 2,899,397 describes mixed aqueous emulsions of polyamide and epoxy resins prepared by mixing a solution of epoxy resinous material with a solution of polymeric polyamides, combining the two solutions in the presence of an aqueous medium containing a water soluble organic carboxylic acid and agitating the combined solutions to produce an emulsion.

Wittcoff and Renfrew U.S. Pat. No. 2,811,495 discloses mixtures of suspensoids of polyamide resins and complex epoxide resins, but there is no suggestion of the compositions of the present invention.

Frihart U.S. Pat. No. 5,296,557 discloses two-component curable hot melt adhesive compositions in which the polyamide component is substantially free of piperazine-containing polyamines and comprises at least one branched diamine, with preferably an excess of free amine to acid groups. The epoxy component is preferably a multifunctional epoxy novolac resin. The thermoset final product has heat resistivity and may be applied to substrates such as nonwoven fabrics and polycarbonates.

Smith and Hagedorn U.S. Pat. No. 5,095,058 discloses polyamide resin dispersions for hot melt adhesive applications, which have a low acid number achieved with a neutralizing base such as KOH, a nonionic or other surfactant to promote emulsification, and a stabilizing agent such as glycine.

Smith and Frihart WO 92/19677, published Nov. 12, 1992, contains much the same disclosure as the U.S. Pat. No. 5,095,058, but additionally includes an epoxy component, e.g., the composition of Example 2 contains UNI-REZ 2636 and EPI-REZ W55-5003. There is also disclosed the addition of a neutralizing acid or base which is present in an amount effective to neutralize residual acid or base in the polyamide resin.

Polyamide resin microdispersions and methods for the manufacture thereof are also disclosed in WO 92/16579, published Oct. 1, 1992. The polyamide microdispersions disclosed therein have improved stability against phase separation and gelation. Additionally, they are capable of forming clear, continuous films at ambient or near ambient temperatures.

One problem with many of the prior art epoxy/polyamide resin compositions is the rapid reactivity of the mixed resins, producing in a relatively short amount of time an infusible, insoluble composition. Where such compositions are intended for use as adhesives in the type of application to which the method of the present invention is directed, this brief reaction time requires that the resin mixture be prepared at point of use and in relatively small quantities. Attempts have been made to lengthen the shelf life of these compositions; however, such attempts have met with little success. In addition, relatively large amounts of volatile organic solvents used in these processes (e.g., toluene, isopropanol, methylethyl ketone) are flammable and environmentally undesirable.

The present invention provides an improvement over the prior art in that it provides as a single, uniform composition, a curable polyamide and epoxy resin mixture, i.e., an adhesive resin system with good stability properties, and with the ability to be cured, almost immediately after the application of heat, to a final product that is resistant to high heat and humidity conditions, has good initial strength properties, improved adhesive and cohesive strength, and resistance to remelting (or softening with heat), solvent attack and moisture damage. These properties are obtained almost immediately upon heat sealing of the adhesive resin system to a substrate with readily usable and available equipment and conditions, whereby curing to the final adhesive product and establishment of the adhesive bond is obtained. Furthermore, the adhesive resin system, prior to curing, possesses excellent shelf life, with stability to premature curing in excess of one year. These characteristics are especially valuable in cured adhesive products which must perform under challenging conditions of temperature, humidity, and mechanical stress. In addition, the adhesives of the present invention possesses greater ductility and flexibility and are easier to employ. The adhesives are especially useful with difficult to bond substrates, including polycarbonate resins.

There is an ongoing need for new and/or better curable epoxy and polyamide resin compositions, particularly compositions having all of the properties heretofore required of an adhesive, but additionally being able to bond to difficult surfaces such as polycarbonate, being curable at elevated temperature, but once cured, also being sufficiently heat and moisture resistant to successfully withstand sterilization conditions, within a short time after heat sealing with readily usable and available equipment and conditions. The present invention is directed to these important ends.

SUMMARY OF THE INVENTION

The present invention relates to an aqueous dispersion of a polyamide/epoxy, thermoplastic-thermoset curable adhesive resin system, comprising:

(a) a non-solvated aqueous dispersion of a solid epoxy resin having unreacted epoxy groups numbering, on average, between about 2 and about 8; and (b) a non-solvated aqueous dispersion of a mixture of solid polyamide resins comprising: (i) an acid terminated polyamide resin having an acid number, on average, of from about 10 to about 30, in an amount of from about 20% to about 60% by weight of the total weight of polyamide resin; and (ii) an amine terminated polyamide resin having an amine number, on average, of from about 5 to about 30, in an amount of from about 80% to about 40% by weight of the total weight of polyamide resin; and combined with said mixture of polyamide resins, a neutralizing base in amount sufficient to neutralize from about 50% to about 100%, on an equivalents basis, of the free acid groups occurring on said acid and amine terminated polyamide resin components;

WHEREIN, when said adhesive resin system is cured at elevated temperatures, almost immediately thereafter, the resulting adhesive resin final product and any adhesive bond established thereby, possesses thermal and moisture resistance sufficient to withstand the high temperature and high humidity conditions characteristic of autoclave sterilization;

AND OPTIONALLY:

(c) at least one water soluble, dipolar chemical moiety in an amount effective to stabilize said aqueous dispersions and provide stability in the overall adhesive resin system; said water soluble, dipolar chemical moiety comprising one or more members selected from the group consisting of amino acids of the formula:

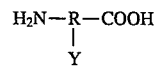

including anionic and cationic salts derived therefrom and mixtures thereof, wherein R is an alkyl, alkenyl, phenyl or phenylalkyl group of one to ten carbon atoms and Y is any polar or non-polar, ionic or non-ionic substituent;

AND OPTIONALLY:

(d) at least one surfactant selected from the group consisting of anionic, cationic and non-ionic surfactants.

The expression "adhesive resin system" as used herein denotes the combination of aqueous dispersions of polyamide resins with neutralizing base, and epoxy resin, optionally together with stabilizing chemical moiety and surfactant. Such systems are very stable with excellent shelf life. These aqueous dispersions are preferably in the form of a mixture, for practical reasons, although these aqueous dispersions could be kept separate and not combined until just before application. The adhesive resin system is thus to be distinguished from the cured final resin product, which is obtained by the application of heat to the adhesive resin system, as well as from any intermediate stage, partially cured products. For example, when a uniform coating of the adhesive resin system of the present invention is applied to the surface of one of the parts of a packaging container, as described in more detail further below, and said coated part is placed in an oven to dry the coating, it is contemplated that under the influence of the heat and disappearance of the aqueous dispersions, that partial, but not complete, curing of the adhesive resin takes place. Complete curing would be undesirable and lead to adhesive failure in the packaging container final product.

Adhesive resin systems of the present invention exhibit a surprising stability to separation, flocculation or reaction at room temperature for at least six months, preferably for at least nine months, and even more preferably for at least one year. The adhesive resin systems of the present invention are also surprisingly capable of forming an adhesive bond at elevated temperatures which, once formed, will maintain its integrity under the severe conditions of sterilization, i.e., high heat and high moisture, within a short time after heat sealing with readily usable and available equipment and conditions.

The present invention further relates to an adhesive resin system as described above, in which said polyamide resin dispersion and said epoxy resin dispersion each have a resin content of at least about 20% by weight of the total weight of the overall aqueous dispersion adhesive resin system; the epoxy resin is an epoxy novolac resin; both the acid and amine terminated polyamide resins comprise a major amount of short chain linear diamine and piperazine, the acid terminated polyamide resin has an acid number, on average, of from about 10 to about 30, and comprises from about 20% to about 60% by weight of the total weight of polyamide resin; and the amine terminated polyamide resin has an amine number, on average, of from about 5 to about 30, and comprises from about 80% to about 40% by weight of the total weight of polyamide resin; the neutralizing base is potassium hydroxide (KOH); the water soluble, dipolar chemical moiety is the amino acid glycine; and the surfactant is nonylphenol polyethoxyethanol.

The present invention still further relates to an adhesive resin system as described above, wherein said system is in the form of a finely divided powder which can be redispersed to reform said adhesive resin system as an aqueous dispersion. Included in this embodiment of the present invention is a powder which is a freeze-dried aqueous dispersion.

In specific application terms, the present invention relates to a packaging container for enclosing and isolating an object to be sterilized by autoclaving, comprising a first part for surrounding and holding said object, and having a portion thereof which forms an opening, said first part being made of a polycarbonate resin; and a second part for covering said opening of said first part, made of a non-woven high-density polyethylene; wherein said first and second parts are adhesively bonded to each other under elevated temperature and pressure by means of the curing of a polyamide/epoxy, thermoplastic-thermoset adhesive resin system as described above.

Included in this embodiment of the present invention is such a packaging container where said first part is in the form of a tray of the type used to carry medical and surgical items for sterilization, the sides or rim thereof being finished with a flange to provide a larger bonding surface. The tray is fabricated from polycarbonate resin, and its open top is covered with and bonded to the second part, comprising a sheet of non-woven high-density polyethylene. The object to be sterilized is one to be utilized in an invasive medical, surgical, or dental procedure, especially a surgical instrument.

In broader application terms, the present invention further relates to a method for adhesively bonding together two or more parts which form a packaging container for enclosing and isolating an object, comprising the steps of 1) applying to all or any portion of one or more of the exposed surfaces of one or more of said parts to be adhesively bonded together, an adhesive resin system as described herein; 2) drying said adhesive resin system so that substantially all of the water content of the aqueous dispersions thereof is removed; 3) joining together under pressure the portions of said surfaces of said parts to be adhesively bonded, and simultaneously subjecting said portions of said packaging container thus formed to elevated temperatures in order to cure said adhesive resin system into a cured adhesive resin final product which securely bonds together all of said portions of said surfaces of said parts of said packaging container.

In particular, the adhesive resin system of the present invention exhibits long shelf life, i.e., stability to premature curing, separation, flocculation or significant reaction at room temperature for at least six months, and is capable of forming an adhesive bond at elevated temperatures which, once formed, will maintain its integrity under the conditions of sterilization to which said packaging container is subjected, within a short time after heat sealing with readily usable and available equipment and conditions. Such elevated temperatures will especially comprise a temperature in the range of from about 225° to about 275° F., and the conditions of sterilization will especially comprise temperatures in the range of from about 250° to 275° F.

The present invention is also directed to a packaging container, one or more parts whereof are adhesively bonding together, and which is made by the steps of 1) applying to all or any portion of one or more of the exposed surfaces of one or more of said parts to be adhesively bonded together, an adhesive resin system as described herein; 2) drying said adhesive resin system so that substantially all of the water content of the aqueous dispersions thereof is removed; 3) joining together under pressure the portions of said surfaces of said parts to be adhesively bonded, and simultaneously subjecting said portions to elevated temperatures in order to cure said adhesive resin system into a cured adhesive resin final product which securely bonds together all of said portions of said surfaces of said parts, thereby forming said packaging container. Such elevated temperatures will especially comprise a temperature in the range of from about 225° F. to about 275° F.

In particular, such a packaging container is one which will be used for enclosing and isolating an object to be sterilized by autoclaving, comprising a first part for surrounding and holding said object, and having a portion thereof which forms an opening, said first part being made of a polycarbonate resin; and a second part for covering said opening of said first part, made of a non-woven high-density polyethylene; wherein said first and second parts are adhesively bonded to each other under elevated temperature and pressure by means of the curing of a polyamide/epoxy, thermoplastic-thermoset adhesive resin system as described above. Included is such a packaging container comprising a tray fabricated from polycarbonate resin and of the type used to carry medical and surgical items for sterilization, the sides being finished with a flange. The tray's open top is covered with and bonded to a sheet of non-woven high-density polyethylene after the object to be sterilized is placed in the tray.

DETAILED DESCRIPTION OF THE INVENTION

The adhesive resin systems of the present invention are in the field of thermoplastic-thermoset adhesives based on polyamide resins in combination with epoxy resins. The polyamide resin contains sufficient reactive amine groups to react with the epoxy resin when the two resins are molten, i.e., thermoplastic, and thereby produce a cured, i.e., thermoset resin. However, the number of unreacted epoxy groups and the number of reactive amine groups on the polyamide resin must be such that curing produces the desired amount of flexibility in the cured resin end product. Said end product must not be the result of overly extensive curing and cross-linking, so that it is hard and brittle. The ratio of unreacted epoxy groups and unreacted amine groups must also be such that the adhesive resin system is not subject to premature curing, so that the adhesive resin system will have a suitably long shelf life, preferably in excess of one year, while at the same time being able to provide a cross-linked and cured adhesive resin final product with the desired properties, as the result of the application of heat and pressure, within a short time after heat sealing with readily usable and available equipment and conditions. The epoxy and polyamide resins are in solid form and applied as an aqueous suspension of fine particles.

The epoxy resin component of the adhesive resin system of the present invention is an important, but minor component, compared to the major amount of the two polyamide resin components which is present. Generally, the epoxy component will be from about 2% to about 20% by weight, based on the total polyamide weight, i.e., the sum of the weights of the two individual polyamide resin components. Amounts of epoxy resin in excess of the indicated maximum may not be able to enter into effective cross-linking reactions with the polyamide resin, since the polyamide resin molecules will have already been totally cross-linked with epoxy molecules, or else possibly the epoxy molecules will not be able to gain physical access to the free amine groups located on the physically larger and dominant polyamide resin molecules. These excess amounts of epoxy molecules would then act as a diluent, resulting in undesirable viscosity changes in the adhesive resin system. Polyamide resins have traditionally been referred to as "curing" epoxy resins to which they are added. The curing results from the cross-linking for which the free amine groups on the polyamide resin are responsible, and amine compounds are well known curing agents for epoxy resins. With the adhesive resin systems of the present invention, however, it would probably be more proper to refer to the epoxy resin component as "curing" the polyamide resin components, since the latter form the major portion of the resin system. Since this is not a traditional notion, however, it will not be consistently referred to in this way.

The present invention is also in the field of epoxy and polyamide resin formulations which are particularly tailored to meet specific application needs, which in this case is for use in making packaging which will maintain the integrity of its adhesive bond under conditions of sterilization in an autoclave, within a short time after heat sealing with readily usable and available equipment and conditions. Particularly, the specific application is for use in making packaging which requires adhesive bonding of one part of the package comprising a polycarbonate resin, to another part of the package comprising a spunbonded nonwoven material made from high-density polyethylene.

More particularly, the first part of said package will be a rigid, typically rectangular container without a cover, i.e., a tray of the type typically used to carry medical, surgical or dental items for sterilization in an autoclave. Such a tray usually has a flat bottom and proportionately low rim or sides. It is desirable to have the sides or rim finished with a projecting edge, i.e., a lip or flange, which produces additional surface area to which the adhesive bond to the second part of said package will be made.

The second part of said package is a cover for said first part, i.e., the tray, and is bonded to the entire lip or flange area of said tray, after the object to be sterilized in placed in said tray. The cover is a solid sheet of non-woven high-density polyethylene. The nonwoven material is porous and permits access by the sterilizing medium, e.g., air or steam, to the object within the package which is to be sterilized. Although the adhesive bond between the tray and cover is established only at the lip or flange of said tray, the adhesive resin system of the present invention can be applied to the entire surface of said cover, and it is often desirable to do so as a practical matter. Consequently, as described herein, the adhesive resin system is applied to all or any portion of the either the first or second part, or both, of the packaging container.

The specific applications described above either may require or at least demand as a matter of preference, that the polyamide/epoxy, thermoplastic-thermoset adhesive resin system, as well as the cured adhesive resin final product:

1) be capable of ready application, good adhesion and rapid curing in a system which avoids volatile solvents, which means that it should be an aqueous dispersion and applied as such, after which it is dried to remove the water content of the aqueous dispersion, and subsequently cured or cross-linked to an adhesive resin final product by the application of heat and pressure, which assures rapidity of curing and mechanical adhesion by movement of the molten adhesive into the pores of the substrate(s) to be bonded;

2) while being applied and cured at a high temperature, at the same time possess, once cured, the high heat resistance and high moisture resistance necessary to withstand the sterilization process, e.g., by autoclaving, which means that the thermoset resin should comprise the proper balance of all of the components in the mixed polyamide/epoxy resin system, recognizing that these will preferably be mixed a substantially long time prior to use and after being applied, will be dried, and then cured under elevated heat and pressure, which assures better adhesion and higher cohesive strength; the thermoset resin final product also providing high thermal, moisture, chemical and solvent resistance, and good impact resistance; and 3) have the desired properties of acceptable pot life, tackiness, adhesiveness, wettability, flexibility, and low crystallinity, i.e., low brittleness; it being recognized that the overall properties of the polyamide/epoxy thermoplastic-thermoset resin final product can be varied by adjusting the ratio of the epoxy, polyamide and other components (reactants), e.g., increasing the polyamide content gives greater flexibility, elongation, and peel strength, but reduces structural strength, creep resistance, and hardness.

It is also noteworthy that the following unexpected results have been achieved in accordance with the present invention, using the adhesive resin system described herein:

1) the manner of successfully achieving bonding to a polycarbonate surface, which heretofore has required special surface treatments prior to bonding; and especially achieving a sufficiently high level of adhesive bonding such that "adhesive transfer" is obtained, i.e., when the adhesive resin aqueous dispersion of the present invention is applied to a non-woven high-density polyethylene adherend and dried, and said polyethylene adherend is then bonded to a polycarbonate adherend using the application of heat and pressure, after which mechanical separation of the polycarbonate and non-woven high-density polyethylene adherends is effected by the application of force (after curing of the adhesive resin of the present invention is complete), said adhesive resin will be found to be attached to said polycarbonate adherend, and completely detached from said polyethylene adherend, thus having been "transferred" from the polyethylene adherend to which it was originally applied, to the polycarbonate adherend to which it ended up being attached;

2) the manner of successfully balancing the strongly adhesive and heat and moisture resistance properties of the cured final product on the one hand, against the stability and dispersibility, and especially the anionic/cationic makeup of the polyamide/epoxy, thermoplastic-thermoset adhesive resin system, on the other hand; all in the context of the known difficulty of bonding polycarbonate and high-density polyethylene materials together.

The Adhesive Resin System May Be in The Form of Aqueous Dispersions

The present invention may be in the form of an aqueous dispersion. Such aqueous dispersions obviate the need for removal of volatile solvents, with all of the expense and environmental risk associated therewith. The aqueous dispersions may be employed in the application of a polyamide/epoxy thermoplastic-thermoset adhesive resin system which is to be activated by elevated temperature and cured to a heat and moisture resistant product.

In connection with such aqueous dispersions, the expressions "non-solvated aqueous dispersion of a solid epoxy resin" and "non-solvated aqueous dispersion of a mixture of solid polyamide resins" have been employed. The "non-solvated aqueous dispersion of a solid epoxy resin" as used herein refers to solid/liquid dispersions of solid epoxy resin particles in water, wherein the epoxy phase comprises solid particles suspended in said water, preferably with the use of one or more surfactants, as well as ultimately, the creation of ionic species. The expression "non-solvated aqueous dispersion of a mixture of solid polyamide resins" as used collectively herein is meant to include those dispersions of solid polyamide resin particles in water having average volume particle size of preferably less than about 1 μ, although particle sizes of up to about 20 μ may be suitable for use.

The term "non-solvated" as used herein means that the epoxy and polyamide resin dispersions of the present invention contain no organic solvents in amounts sufficient to dissolve the respective resins. The term "aqueous", as used in connection with the separate polyamide and epoxy resin dispersions, denotes a water-based dispersion. The manner in which these dispersions are prepared, and the types of surfactants that may be employed in that regard, are described further below.

The Adhesive Resin System Exhibits Surprising Stability

The term "stable", as used in connection with the separate polyamide and epoxy resin dispersions, as well as with the overall adhesive resin system, which is an aqueous dispersion, refers to the stability of the separate dispersions, which when cooled to ambient temperatures, that is, room temperature, will not separate, prematurely cure, flocculate or significantly react with one another for at least six months, preferably not for at least nine months, and even more preferably not for at least one year. It has been found, moreover, that the dispersions prepared in accordance with the present invention typically will be stable over extremely long periods of time, i.e., periods well in excess of one or two years.

In accordance with the present invention there is first prepared a stable, non-solvated, aqueous dispersion of an epoxy resin as described further below, and a stable, non-solvated aqueous dispersion of a polyamide resin as described further below; and there is optionally employed to stabilize these dispersions, as well as provide stability in the overall adhesive resin system, an effective amount of at least one water soluble, dipolar chemical moiety comprising one or more members selected from the group consisting of amino acids of the formula:

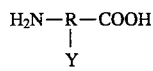

including anionic and cationic salts derived therefrom and mixtures thereof, wherein R represents an alkyl, alkenyl, phenyl or phenylalkyl group of between one and ten carbon atoms, specifically including any and all integers therebetween; and Y is any polar or non-polar, ionic or non-ionic substituent. These moieties are typically amino acids, and include, e.g., para-aminobenzoic acid, glycine, lysine, arginine, phenylalanine and serine. Particularly preferred are glycine and para-aminobenzoic acid. Additionally, anionic or cationic salts derived from those amino acids and mixtures thereof may also be used to stabilize the aqueous dispersions of the epoxy, polyamide, or mixed resins in the adhesive resin system. Mixtures of amino acids and the salts of amino acids may also be used to stabilize the aqueous dispersions of the present invention.

The stabilizing, water soluble, dipolar chemical moiety or moieties which are optionally included in the adhesive resin systems of the present invention may be incorporated as a reactant during formation of an epoxy or polyamide dispersion, or may be incorporated into a dispersion after the formation thereof. It is preferred that such epoxy and polyamide resin dispersions have the stability enhancing moiety added after their formation. Thus, in a preferred method of incorporating the stability enhancing moiety in the adhesive resin system, a predetermined amount of one or more of the moieties is added to the combined aqueous dispersions of the epoxy resin and polyamide resins as soon as said mixture is formed and while it is still at an elevated temperature. The added moiety should be effective to improve the stability of an aqueous dispersion of the epoxy resin, the polyamide resins, or a mixture of these aqueous dispersions. In another, but less preferred method of preparing the epoxy or polyamide resin dispersion, when the epoxy or polyamide resin is heated to form a water-in-oil emulsion, which is then inverted by adding thereto an effective amount of inversion water, said water will have dissolved therein a dispersion-stabilizing amount of the water soluble, dipolar chemical moiety, e.g., glycine.

The Epoxy Resin Component of the Adhesive Resin System Contributes to Thermal Stability Another feature of the adhesive resin systems of the present invention is the aqueous dispersion of a solid epoxy resin, which when reacted with the polyamide resins during the curing or cross-linking step at elevated temperatures, gives a cured adhesive resin final product which possesses thermal and moisture resistance. The epoxy resin has unreacted epoxy groups numbering, on average, between about 2 and about 8. Various epoxy resins well known in the art, are recognized as having, in their cured, thermoset state, a high degree of thermal resistance or stability. Such epoxy resins are cured with anhydride, amine and other curing agents, and would not be suitable, by themselves, for the particular adhesive applications for which the adhesive resin system of the present invention provides such uniquely advantageous results. However, it is clear that the epoxy resin component of said adhesive resin system contributes in a substantial way to achieving the thermal resistance in the cured adhesive resin final product; although in view of the significantly minor proportion of the epoxy resin, and the extensive cross-linking which takes place between it and the significantly major proportion of the polyamide resins, it is also clear that the cured adhesive resin final product is extremely complex and its properties are not readily predictable from the component reactants thereof.

There exist numerous types of epoxy resins having unreacted epoxy groups, that is, oxirane group containing compounds, which may be employed to form the aqueous epoxy resin dispersions used in the present invention. The phrase "epoxy resin having unreacted epoxy groups" is used herein to collectively refer to oxirane group containing compounds, and polymers and mixtures of these compounds with other materials.

While the description herein generally refers to an aqueous dispersion of but a single epoxy resin component in the overall thermoplastic-thermoset curable adhesive resin system of the present invention, it will be understood that it is within the scope of the present invention to include more than one such epoxy resin component. Where one of ordinary skill in the art would find it beneficial to use more than one such epoxy resin component, e.g., where commercially available epoxy resin compositions were being employed and it was determined that a blend of two or more such epoxy resin compositions would enhance certain desired properties in the curable adhesive resin final product, then it is understood that the term "a solid epoxy resin" as used herein with regard to the epoxy resin component of the overall adhesive resin system, is contemplated to optionally include the possibility that it comprises two or more distinct epoxy resin compositions which go together to make up the epoxy resin component.

The various chemical and physical properties of a cured epoxy resin are not only attributable to the nature of the epoxy resin involved, including the average number of unreacted epoxy groups, but on the nature and amount of the so-called "curing" agent as well, which in this case is the mixture of polyamide resins. It has already been noted that it is the unreacted amine groups on said polyamide resins which are responsible for curing, i.e., the cross-linking reactions with the epoxy resin component, but that, it would probably be more accurate to state that the epoxy resin is the "curing" agent for the polyamide resins, since the latter are by far the dominant component compared to the former.

The unreacted amine groups occur on the acid terminated polyamide resin component, as well as on the amine terminated polyamide resin component of the adhesive resin compositions of the present invention, although they predominate in the latter. By using amine terminated polyamide resins within the range of proportionate amounts specified for the present invention, and which have amine numbers within the range specified for the present invention, it is possible to achieve a cured adhesive resin final product which has not only the required adhesive integrity and strength, as well as the necessary thermal and moisture resistance, but the degree of flexibility, dispersibility and stability which are needed as well.

Correspondingly, however, it is also desirable to avoid using amine terminated polyamide resins beyond the range of proportionate amounts specified, and having amine numbers beyond the range specified, for the present invention. Indeed, it has been surprisingly found that such excessive amounts of amine groups may lead to stability problems with the solid polyamide resins prior to their dispersion, making their incorporation into, and subsequent use with the remaining components of the adhesive composition, problematic. Since the primary role of the amine groups is to react with the epoxy groups in order to provide a cross-linked, "cured" adhesive resin final product, it has been found that the number of amine groups can be reduced, while at the same time achieving the same extent of cross-linking, by carrying out the step of blending the polyamide and epoxy resins at elevated temperatures, i.e., higher than ambient room temperature, especially about 90° C. as detailed further below, that it is possible to achieve the surprisingly superior products of the present invention while keeping the amine number of the amine terminated polyamide resin component well below the maximum of about 30 which has been specified herein.

The product thus prepared is an "intermediate" product, i.e., it has to go through "curing" at more elevated temperatures than those described above in order to produce the cured adhesive resin final product having improved heat and moisture resistance. It is hypothesized that preparation of the initial or intermediate adhesive resin aqueous dispersions at elevated temperatures, as well as for extended dwell times, may alter the physical/chemical domains, and cross-linking reactions and/or kinetics so that epoxy/polyamide resins are produced which are able to achieve more facile cross-linking during subsequent application of elevated temperatures, than would otherwise be the case.

It is also contemplated, however, that the adhesive resin compositions of the present invention can be prepared at ambient room temperature, in which case one or more of the following will have to be increased: the proportionate amount of amine terminated polyamide resin, and/or the amine number of said resin, and/or the amount of epoxy resin, and/or the number of unreacted epoxy groups on said resin.

The polyamide resins are the dominant resin component, compared to the amount of epoxy resin which is present in the adhesive resin system. The epoxy resin component will comprise from about 1% to about 20% by weight of the total weight of polyamide resin present, i.e., based on the total weight of the two polyamide resin components present in the adhesive resin system. Preferably, the amount of epoxy resin present will be from about 3% to about 15% by weight, more preferably from about 4% to about 10% by weight, and most preferably about 5% by weight, based on the total weight of polyamide resins present in the adhesive resin system. An excess of epoxy resin in the adhesive resin system should be avoided. The cross-linking reaction between the epoxy resin and the polyamide resins is not stoichiometric because of the dominance, both in terms of amount and size of molecule, of the polyamide components. The mechanics of the polymerization reaction dictate that a some number of unreacted epoxy groups will not have access to, and therefore will not react with, the free amine groups of the polyamide resins. Where epoxy resin is added in excess of the amount which will actually be capable of reacting with the polyamide resin present, it will then only serve as a diluent, with potential adverse effects on the viscosity and other properties of the adhesive resin system.

The expression "which contributes to heat and moisture resistance in the adhesive resin in cured form" as used herein in connection with the epoxy resin, means that said epoxy resin component of the adhesive resin system must be chosen so that when the adhesive resin system is cured through the interaction, i.e., crosslinking of the epoxy and polyamide components of said adhesive resin system at suitably elevated temperatures, the polyamide/epoxy resin which results will impart to the cured adhesive resin final product, heat and moisture resistance properties such that said adhesive resin final product, and the adhesive bond which it forms between two or more adherends that are adhesively bonded together thereby, will maintain their integrity, i.e., not suffer any degradation, substantial weakening, decline, breaking, or interruption, under conditions of sterilization, i.e., the high temperatures and high moisture encountered during autoclaving.

It is important to emphasize, nevertheless, that despite the importance of the contribution of the epoxy resin component to the heat and moisture resistance of the cured adhesive resin final product, that other components and aspects of the present invention also contribute to that final result. As has already been described, e.g., the proportionate amount of the amine terminated polyamide resin, its amine number, and the temperature at which the adhesive resin aqueous dispersions are initially prepared, as well as the proportion of the acid terminated polyamide resin and its acid number and the amount of neutralizing base, and to a lesser extent the stabilizing dipolar moiety and surfactant, will all have an effect on the adhesive efficacy, and heat and moisture resistance of the cured adhesive resin final product.

Equally important to the creation of a cured adhesive resin final product which maintains the integrity of the adhesive bond under conditions of high heat and humidity, is the rapidity with which such a cured adhesive resin final product is formed. It is a further unexpected advantage of the adhesive resin system of the present invention that the cured adhesive resin final product, and the adhesive bond which it establishes, is obtained almost immediately after the application of heat and pressure, sometime called "heat sealing". During such an operation, the composite comprising the substrates to be bonded together with the adhesive resin system between them, is placed in a simple device which applies mechanical pressure by means of a heated bar for a preset period of time. Such heat sealing will be complete when carried out for only a few seconds.

The term "adhesive transfer" is used herein to describe an adhesive bond which meets the above-described integrity requirements. In relation to a preferred embodiment of the present invention, the term means that when the adhesive resin aqueous dispersion of the present invention is applied to a non-woven high-density polyethylene adherend and dried, and said polyethylene adherend is then bonded to a polycarbonate adherend using the application of heat and pressure, after which mechanical separation of the polycarbonate and non-woven high-density polyethylene adherends is effected by the application of force (after curing of the adhesive resin of the present invention is complete), said adhesive resin will be found to be attached to said polycarbonate adherend, and completely detached from said polyethylene adherend, thus having been "transferred" from the polyethylene adherend to which it was originally applied, to the polycarbonate adherend to which it ended up being attached. It has been found that where the cured adhesive resin final product and the adhesive bond established thereby do not meet the integrity requirements described herein, that when the adhesively bonded adherends are separated, the adhesive bond to the more difficult to adhere substrate, i.e., the polycarbonate adherend, will totally fail and the adhesive resin will remain adhered to the less difficult to adhere substrate, i.e., to the non-woven high-density polyethylene to which it was originally applied.

The expression "at elevated temperatures", when used herein in connection with the curing of the adhesive resin system, means a temperature generally in the range of from about 175° to about 325° F., preferably from about 200° to about 300° F., and more preferably, from about 225° to about 275° F. The expression also contemplates a range of corresponding curing times which are appropriate and practicable in view of the circumstances under which the adhesive bond is being formed. It will be appreciated that the higher curing temperatures often permit a corresponding reduction in the amount of curing time required. The curing time which is necessary to provide a stable, heat and moisture resistant bond in accordance with the present invention will generally be in the range of from about 1 sec. to about 1 min., although for practical considerations, the shorter curing times are clearly more desirable, and the adhesive resins of the present invention may be satisfactorily cured within about 1 to about 10 sec., usually about 2 to about 5 sec., and often in about 3 sec. In addition to elevated temperature and time, the application of pressure is desirable and preferred for the purpose of assuring an adhesive bond which will not fail under sterilization conditions. The amount of pressure which should be applied to achieve this objective will be between about 10 and 100 psi, preferably about 20 to 80 psi, and more preferably from about 40 to 60 psi. It has been found that a pressure of about 50 psi usually provides a sufficient amount of pressure to obtain a good and lasting adhesive bond in accordance with the present invention. Consequently, the expression "at elevated temperatures" also optionally, but preferably, includes as well the application of elevated pressures within the above-described ranges.

The expression "under conditions of sterilization" as used herein, with reference to the integrity of both the cured adhesive resin final product of the present invention, as well as the adhesive bond which it forms between two or more adherends that are adhesively bonded together thereby, means the process conditions which are usually employed to achieve sterilization of an object, in which microorganisms and other contaminating particles on said object are effectively destroyed or neutralized. The apparatus most commonly employed to achieve such sterilization is the autoclave, which comprises a chamber which can be sealed, and into which superheated steam is introduced under elevated pressures to obtain that result. In order to achieve such sterilization conditions, temperatures well above the boiling point of water, i.e., 212° F., are typically employed, preferably from about 225° to 300° F., more preferably from about 250° to 275° F. Operating conditions for a typical autoclave would require temperatures of about 250° F.; pressures in the range of from about 10 to 30 psi, preferably 15 to 25 psi, more preferably about 16 to 20 psi; and duration times in the range of from about 30 min to 1 hr, preferably from about 35 to 55 min, more preferably from about 40 to 50 min. Typical autoclaving conditions would be 250° F. at 18 psi for 45 min. Steam, present as superheated steam, is present as part of the sterilization conditions in an autoclave, and thus the moisture content, or humidity is also a factor which must be considered with regard to its effect on the integrity of the adhesive resin system. The humidity levels are typically quite high, being from about 85% to about 100% relative humidity, and more often from about 95% to about 100% relative humidity.

The epoxy resin component of the adhesive resin system of the present invention, which when interacted with the polyamide resin components, must be capable of conferring heat and moisture resistance on the adhesive resin in cured form, may be chosen from those well known in the art, which can be obtained commercially or can be prepared by generally well known methods. Such epoxy resins include, but are not limited to, the diglycidyl ethers of bisphenol A (commonly referred to as DGEBA or bis-epi resins), brominated resins, epoxyphenol novolac and epoxy cresol novolac resins, and cycloaliphatic resins.

The common bis-epi resins will usually be less suitable for use in the present invention; however, special types of this class of epoxy resin may be more desirable, e.g., a methylolated version offered by the Apogee Products Group of M&T Chemicals (Rahway, N.J.), sold as Apogen 101. The methylol groups increase the reactivity of the epoxy groups multi-fold, and the resins exhibit faster cure at low temperatures. A similar resin, diglycidyl ether of 4-methylol resorcinol may also be employed.

A more suitable type of epoxy resin for use in the compositions of the present invention are the epoxy novolac resins, which combine the reactivity of the epoxy group and heat and moisture resistance of the phenolic backbone. This class of epoxy resins may be synthesized by reacting epichlorohydrin with novolac resin, where the novolac resin component is prepared by condensing phenol with formaldehyde under acidic conditions and at a formaldehyde-to-phenol molar ratio of less than unity, e.g., from about 0.5 to about 0.8. The number of epoxide groups in most commercial resins of this type varies from about 2.2 to about 3.8. The high epoxide functionality, in comparison with the bis-epi resins, results in higher density of crosslinks and hence improved heat-resistance. The epoxy novolac resins can also be prepared from substituted phenols such as cresol, or polyhydroxy phenols such as resorcinol.

Yet another suitable class of epoxy resins that may be employed are the epoxidized olefins, such as Bakelite ERL 4221 from Union Carbide (Danbury, Conn.) and Araldite CY-179 from Ciba-Geigy (Hawthorne, N.Y.). However, selection of epoxy resins from this class must be made with care, since they tend to form brittle products with poor adhesive properties.

These and other examples of epoxy resins suitable for use in the present invention are described, for example, in Lee and Neville, *Handbook of Epoxy Resins*, McGraw-Hill, Inc. (New York, 1967), the disclosure of which is incorporated herein by reference, in its entirety.

The preferred epoxy resins are those of the polyglycidyl ethers of novolac resins, which are typically derived from phenol-formaldehyde or cresol-formaldehyde. DEN 438 and 439 are epoxyphenol novolac resins having an epoxy equivalent weight of 170 to 210 and a viscosity in centipoises at 80° C. of 1,000–30,000, commercially available from Dow Chemical Company (Midland, Mich.).

In order to achieve a cured adhesive resin which has the required adhesive properties as well as the required heat and moisture resistance, the epoxy resin should be in solid form, and used as an aqueous dispersion. Although dispersions of liquid epoxy resins are possible, it has been found that such resins are generally unsuitable for use in preparing the adhesive compositions of the present invention.

As will be apparent to those skilled in the art, the epoxy resin employed in the present invention can be dispersed to form a non-solvated aqueous epoxy resin dispersion using a number of techniques. Preferably, the resultant epoxy resin dispersion, prepared by whatever technique, has a high resin content as defined above, and more preferably, from about 40 to about 70% by weight, based on the total weight of the epoxy resin dispersion.

One dispersion technique which may be useful in preparing the epoxy resin dispersions used in the invention is as follows. First, the epoxy resin is liquified by heating to at least its melting point, and more preferably to a temperature of at least about 5° C. above its melting point, but below the decomposition temperature of the epoxy resin. The heating is preferably carried out with rapid stirring. The melting temperature of the epoxy resin will vary considerably depending upon the particular epoxy resin employed. Typically, however, these epoxy resins will melt at temperatures from below ambient to about 100° C. In a separate vessel, water is heated to a temperature which is preferably at least as high as the melting point of the epoxy resin which is to be dispersed, and more preferably at least about 5° C. higher than the melting point of the epoxy resin. In an alternative method, the water can be heated to a temperature somewhat below the temperature of the epoxy resin and the epoxy resin heated to a temperature significantly above its melting point so that the resulting blend of water and epoxy resin will have a temperature above the melting point of the epoxy resin. The water is generally added to the molten epoxy resin in a drop wise fashion, with rapid stirring.

The Polyamide Resin Components of the Adhesive Resin System and the Neutralizing Base Confer Unique Adhesive Properties Another component of the adhesive resin compositions of the present invention is the aqueous dispersion of a mixture of solid polyamide resins comprising:

(i) an acid terminated polyamide resin having an acid number, on average, of from about 10 to about 30, preferably from about 15 to about 25; and in an amount of from about 20% to about 60% by weight, preferably from about 25% to about 55% by weight, and more preferably from about 30% to about 50% by weight, based on the total weight of polyamide resin; and (ii) an amine terminated polyamide resin having an amine number, on average, of from about 5 to about 30, preferably from about 7 to about 20, and more preferably from about 9 to about 16; and in an amount of from about 80% to about 40% by weight, preferably from about 75% to about 45% by weight, and more preferably from about 70% to about 50% by weight, based on the total weight of polyamide resin.

With regard to the acid and amine terminated polyamide components of the compositions of the present invention, it is noted here, and described in more detail further below, that an important feature of this component is the concomitant use therewith of a neutralizing base. This neutralizing base produces neutralized sites on the free acid groups of the acid and amine terminated polyamides, thereby creating ionic species which not only aid in dispersion, but also are contemplated to play a key role in adhesion of the overall composition to difficult-to-bond substrates, e.g., polycarbonate resin substrates.

As will be recognized by those of ordinary skill in this art, polyamide resins such as those employed in the present invention, are complex materials formed from various polyacid and polyamine reactants. Consequently, they are a mixture of various polyamide reaction products which are also present in a range of molecular weights as well. Moreover, by utilizing stoichiometric excesses of either the polyacid or polyamine, it is possible to obtain polyamide resin final products which are largely acid terminated or amine terminated. However, because of the involved reaction kinetics which govern polymerization, not all of the end groups and other reactive sites are, in fact, involved in the intended reaction. Thus, the acid terminated polyamides utilized in the present invention have some unreacted amine groups; and the amine terminated polyamides utilized in the present invention have some unreacted acid groups.

The unreacted amine groups are essential to the curing which results from interaction and cross-linking with the epoxy resin component. The unreacted acid groups, as ionic neutralized sites, are essential both to establishing a chemical bond to such adherend surface compositions as polycarbonate, as well as to dispersibility when they are made into ionic neutralized groups by the addition of the neutralizing base. Thus, in order to achieve the surprising results obtained with the adhesive resin systems of the present invention, it is necessary to balance, in accordance with the proportionate amounts described herein, the unreacted amine groups, and neutralized acid groups present on the polyamide resin components of the present invention.

The term "neutralizing base" as used herein is intended to include any one or more compounds which will yield hydroxyl ions in aqueous solution and which will react with the free acid groups of both the acid terminated and amine terminated polyamide resin components so as to form ionic species therewith. The neutralizing base will be used in an amount sufficient to neutralize from about 50% to about 100%, on an equivalents basis, of the free acid groups occurring on the acid and amine terminated polyamide resin components. Any number of such bases are known and may be employed, provided that they achieve their purpose of neutralizing the free acid groups on the polyamide resin components, and are compatible with the other components of the adhesive resin system and its use in various adhesive applications as described herein.

Preferably, the neutralizing base will be selected as one or more members of the group consisting of the alkali metal and alkaline earth metal hydroxides, e.g., sodium hydroxide (NaOH), potassium hydroxide (KOH), magnesium hydroxide [Mg(OH)2], and calcium hydroxide [Ca(OH)$_2$]. The amount of such neutralizing base which is employed should be in the range of from about 2.0% to about 8.0% by weight, preferably from about 3.0% to about 7.0% by weight, and most preferably from about 4.0% to about 6.0% by weight, based on the total weight of acid terminated polyamide in the adhesive resin system. These preferred ranges of amounts correspond to the preferred ranges of acid numbers and the preferred ranges of amounts of acid terminated polyamide resin which are utilized in making the adhesive resin systems of the present invention. Initially, it is necessary to choose the extent of neutralization, following the guidelines set out herein, which one intends to achieve, after which the acid number and the amount of the acid terminated polyamide to be used in preparing the adhesive resin system must be taken into account. The higher the acid number, of course, the more neutralizing base that will be necessary to achieve the chosen level of neutralization. With regard to the amount of acid terminated polyamide which is to be used, once the desired level of neutralized acid sites described elsewhere herein, is achieved, there are diminishing advantages to be gained by further neutralization, since a sufficient number of acid groups will have already been neutralized to ionic sites, in absolute terms, to afford the improvements with respect to stability and adhesion which the adhesive resin systems of the present invention provide.

It is necessary to neutralize at least about 50%, on an equivalents basis, of the free acid groups occurring on both the acid and amine terminated polyamide components, in order to obtain the desired properties in the cured adhesive resin final product. Preferably, however, from about 75% to about 100%, and more preferably, from about 90% to about 100%, and most preferably, from about 95% to about 100%, on an equivalents basis, of the total number of free acid groups will be neutralized to ionic sites. The expression "on an equivalents basis" refers to the percentage, in absolute terms, of the total number of acid groups on both the acid terminated and amine terminated polyamides which react with the neutralizing base to give an ionic reaction product. In order to achieve this objective, a stoichiometric excess, based on the calculated total amount of free acid sites, should be employed, since the solution mechanics and reaction kinetics involved are such that a significant percentage of the neutralizing base which is added will not be able to reach the free acid sites in order to neutralize them. However, care should be taken not to use an excessive amount of the neutralizing base, since it will have a tendency to solubilize low molecular weight species present in the aqueous dispersion, which in turn will result in an undesired buildup in viscosity of the aqueous dispersion.

The term "non-solvated aqueous dispersion of a mixture of solid polyamide resins" as used herein is meant to include those dispersions of solid polyamide resin particles in water having an average volume particle size of preferably less than about 1 μ, although particle sizes up to about 20 μ can be suitable.

There exist numerous types of polyamide resins having excess acid or amine groups which may be employed to form the aqueous dispersion of a mixture of solid polyamide resins used in the present invention. Polyamide resins are a well-known class of resins and include, for example, nylon-type polyamide resins and polymerized fatty acid polyamide resins. The acid terminated polyamide resins have an acid number, on average, of from about 10 to about 30, preferably from about 15 to about 25. The acid number of an acid terminated polyamide resin suitable for use in the present invention is about 20. The amine terminated polyamide resins have an amine number, on average, of from about 5 to about 30, preferably from about 7 to about 20.

The proportional amounts of the acid terminated and amine terminated polyamide resins may also be important to the makeup of the adhesive resin systems of the present invention. The proportional weight amount ranges have been described above in terms of the percent of the total weight of polyamide present in the adhesive resin system. Expressed in terms of weight ratios of one to the other, the range of such ratios of (acid terminated)/(amine terminated) will be from approximately 1:2 to 3:2, preferably from approximately 2:3 to 4:3.

The polymerized fatty acid polyamide resins and other polyamide resins suitable for use in the present invention can be obtained commercially or can be prepared by generally well known methods.

The term "polymerized fatty acid" as used in this specification is intended to be generic in nature and refers to polymerized acids obtained from fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms, including any and all integers therebetween.

For purposes of facilitating the explanation of this invention, specific references will be made to polymerized fatty acid polyamide resins which are obtained from unsaturated $C_{18}$ fatty acids. It should be appreciated, however, that the compositions and methods of this invention can likewise be practiced using other polymerized fatty acid polyamides, and of course other types of polyamides.

The preferred starting acids for the preparation of the polymerized fatty acids useful in the invention are oleic and linoleic acids because of their ready availability and relative ease of polymerization. Mixtures of these two acids are found in tall oil fatty acids, thus making commercial tall oil fatty acids a convenient source of the starting materials. The fatty acids can be polymerized using various well known catalytic and noncatalytic polymerization methods. A typical composition of the polymerized fatty acids based on the $C_{18}$ tall oil fatty acids which may be used as the starting materials for polyamide resins which may be employed in the present invention is as follows:

| | |
|---|---|
| $C_{18}$ monobasic acids (monomer) | 0–15% by wt. |
| $C_{36}$ dibasic acids (dimer) | 60–95% by wt. |
| $C_{54}$ trimer acid (or higher) or polybasic acids | 0.2–35% by wt. |

In the preparation of the polymerized fatty acid polyamide resins which may be used in the present invention, it is preferable that the starting polymerized fatty acid contain as high a percentage of the dimer acid (the $C_{36}$ dibasic acid) as possible in order to obtain the optimum physical properties in the adhesive resin final product.

In addition to the polymerized fatty acids, a wide variety of dicarboxylic acids can be used in the preparation of polymerized fatty acid polyamide resins which may be employed in the present invention, including aliphatic, cycloaliphatic and aromatic dicarboxylic acids. Representative of such acids, which may contain from 2 to 22 carbon atoms, are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Preferred dicarboxylic acids employed in the invention are straight chain aliphatic diacids having at least about 6 carbon atoms and more preferably about 6 to about 22 carbon atoms, such as azelaic, sebacic, and dodecanedioic dicarboxylic acids. It should be understood that use of the corresponding acid anhydrides, esters, and acid chlorides of these acids is included in the term dicarboxylic acid. Methods of preparing these preferred acids are well known, and many are readily available commercially.

Linear, branched, or cyclic polyamines may also be used in the preparation of the polymerized fatty acid polyamide resin components of the adhesive resin systems of the present invention, and may be one or more of the well known aliphatic, cycloaliphatic or aromatic diamines having from about 2 to about 60 carbon atoms. Preferred are the alkylene diamines. Illustrative of the preferred diamines are ethylene diamine; 1,2-diaminopropane; 1,3-diaminopropane; 1,4-diaminobutane; terephthalyl diamine, known as p-xylene diamine; 1,6-hexamethylene diamine; methyl-1,5-pentamethylene diamine; methyl-1,9-nonane diamine; piperazine; 1-(aminoethyl)piperazine; 1,4-(bisaminoethyl)piperazine; 1,3-di-(1-piperidyl)propane; dimer diamine (diamine made from dimer acid); dipiperazine; 4,4'-methylenebis(cyclohexylamine); 2,2-bis-(4-cyclohexylamine)propane; polyglycol diamines; isophorone diamine; isophthalyl diamine, known as m-xylene diamine; cyclohexanebis(methylamine); 1,4-bis-(2'-aminoethyl)benzene; 4,4'-methylenebis(cyclohexylamine); and piperazine. These diamine compounds are all prepared by well known methods and many are commercially available. Preferred particularly are the straight chain aliphatic diamines of about 2 to about 20 carbons atoms, especially ethylene diamine and hexamethylene diamine, and cycloaliphatic diamines, especially 4,4'-methylenebis(cyclohexylamine) and piperazine. Monoamines may also be added to control molecular weight and functionality. Mixtures of polyamines, including triamines, can be used to obtain a desired balance of properties in the adhesive resin final product.

Polyetherdiamines provide products with improved flow properties. The most preferred polyetherdiamines include diamines made from propylene oxide polymers having molecular weights of from about 100 to about 8,000, diamines made from ethylene oxide polymers having molecular weights of from about 100 to 8,000, and diamines made from ethylene oxide/propylene oxide polymers having molecular weights of from about 100 to about 8,000. Other suitable polyetherdiamines include triamines made from propylene oxide polymers or ethylene oxide polymers and having molecular weights from about 100 to about 8,000.

In the adhesive resin systems of the present invention, it is desirable to use polymerized fatty acid polyamides which have acid numbers and amine numbers within the desired ranges described above, which will correspond to the relative degree of completion of the amidation reaction between the starting polymerized fatty acid and the diamine. Accordingly, the degree of completion of the amidation process can be determined by evaluating the acid number and the amine number of the final polymer. The term "acid number" refers to the number of milligrams of potassium hydroxide required to neutralize the free acid groups which are present in one gram of the polymer. The term "amine number" refers to the number of milligrams of potassium hydroxide equivalent to the free or excess amine groups present in one gram of the final polymer. The polymerized fatty acid polyamide resins having amine numbers of up to about 30, and acid numbers of up to about 30, are useful in the adhesive resin systems of the present invention.

As those skilled in the art would recognize, the number of free acid groups and free amine groups present in the polymerized fatty acid polyamide resin are directly related to the relative amount of the polymeric fatty acids, dicarboxylic acids and the diamines involved in the polymerization reaction, as well as the degree of completion of the reaction. It is within the skill of the artisan, using methods of preparation and techniques known in the art, to prepare acid terminated and amine terminated polyamide resins having acid numbers and amine numbers, respectively, within the ranges required for these components of the adhesive resin compositions of the present invention. Thus, in preparing the required acid and amine number polyamides, amounts slightly in excess of stoichiometric amounts of the polymerized fatty acids plus the dicarboxylic acids on the one hand, and of the diamines on the other hand, based on the total number of available acid and amine groups, should be used to prepare the acid terminated and amine terminated polyamide resin components, respectively. While the reaction conditions should ordinarily be selected to ensure substantial completion of the amidation reaction, it is also possible to employ polyamide resins resulting from less than substantially complete reactions, since a certain quantity of unreacted acid and amine groups are required to be present, as described already herein. The reaction conditions required for the amidation reaction are well known in the art, with the reaction being generally conducted at temperatures from about 100° C. to about 300° C. for about 1 to about 8 hours.

In preparing the stable, non-solvated, aqueous dispersion of a mixture of solid polyamide resins, a number of techniques can be employed. Preferably, the resultant polyamide resin dispersion, prepared by whatever technique, has a high resin content. As used herein, the term "high resin content" denotes a resin content of at least about 20% by weight, based on the total weight of the polyamide resin dispersion.

One dispersion technique which may be used in preparing dispersions of the polymerized fatty acid polyamide resin is as follows. The polyamide resin is first liquified by heating the polyamide resin to a temperature above its melting point, and more preferably to a temperature of at least about 5° C. above its melting point, but below the decomposition temperature of the polyamide resin. The liquification process is preferably conducted in a closed vessel under a protective blanket of inert gas such as nitrogen. The melting temperature of the polyamide resin will vary considerably depending upon the particular starting reactants employed to prepare the polyamide resin. Typically, however, the polymerized fatty acid polyamide resins will melt in the temperature range from somewhat below the boiling point of water to somewhat above the boiling point of water. If the temperature to which the molten polyamide resin will be heated for liquification is above the boiling point of water, the process equipment used must be capable of being operated at elevated pressures and temperatures. In a separate vessel, water is heated to a temperature which is preferably at least as high as the melting point of the polyamide resin which is to be dispersed, and more preferably at least about 5° C. higher than the melting point of the polyamide resin. Under these conditions, the water may be required to be heated and maintained under pressure in order to have sufficient temperature to be higher than the melting point of the polyamide resin. In an alternative method, the water can be heated to a temperature somewhat below the temperature of the polyamide resin and the polyamide resin heated to a temperature significantly above its melting point so that the resulting blend of water and polyamide resin will have a temperature above the melting point of the polyamide resin.

The Optional Surfactant Component of the Adhesive Resin System Provides Surprisingly Enhanced Stability Another optional component of the adhesive resin system of the present invention is a surfactant or combination of surfactants, which is or are added to either the molten epoxy resin or molten polyamide resin, or to the water, or to both the epoxy resin and the water, or to both the polyamide resin and water, in a predetermined amount. The surfactant or combination of surfactants which are used in these epoxy resin and polyamide resin dispersion techniques are ones which will promote the emulsification of the molten epoxy resin and molten polyamide resin in the water, and which will also act to stabilize the final dispersion of the epoxy resin and the polyamide resin in the water. A number of different types of surfactants can be successfully employed in these techniques.

When Used with the Polyamide Resin Components

The surfactants which may be selected for dispersing the solid polyamide resins, i.e., the acid terminated polyamide resin and the amine terminated polyamide resin which are components of the adhesive resin system of the present invention, are those which are capable of acting as water-in-oil emulsifying agents for the polyamide resin-water mixture. The surfactants should also act as oil-in-water emulsifying agents upon inversion of the emulsion. The surfactants include well known anionic, polar and nonpolar nonionic, and cationic surfactants.

The cationic surfactants which have been found to be especially useful in this polyamide resin dispersion technique are the alkyl ammonium salts such as: 1-hexadecyltrimethyl ammonium bromide or chloride; alkyl pyridinium salts such as 1-hexadecylpyridinium bromide and cetylpyridinium chloride; alkyl imidazolinium salts such as 1-hexadecylimidazolinium bromide; and the salts of tallow diamines, such as Jet Amine DT, tallow ammonium chloride salts, such as Jet Quat DT-50, ethoxylated tallow amines, such as Jet Amine DT-5, and the salts of tallow triamines, such as Jetco TRT (manufactured by Jetco Chemicals, Corsicana, Tex.).

Among the anionic surfactants which have been found to be especially useful are the sodium and potassium salts of fatty acids, the sodium and potassium salts of dimer acid or polymerized fatty acids, phosphate esters of fatty acids, and the sodium and potassium salts of rosin.

Among the nonionic surfactants which have been found to be especially useful are nonylphenol polyethoxyethanol, commercially available under the name Tergitol NP-40™ from Union Carbide Corporation (Danbury, Conn.); and polyethoxylated castor oil, commercially available under the name GAF Emulphors™ from GAF Corporation (Wayne, N.J.).

While not all surfactants are suitable for use in the dispersion of polyamide resins according to this technique, it has been found that a wide range of surfactants are suitable. It is relatively simple to screen suitable surfactants for such use. It has been found, for example, that the preferred surfactants are those which exhibit outstanding ability to cause the emulsification of the liquified, i.e., molten polymerized resin in the water. These surfactants are typically also highly effective in imparting a long term stability to the final dispersion.

The surfactants as described above are added either to the molten polyamide resin or to the water to be used in the dispersion process. The surfactant, however, is preferably added to the water because of the relative ease of addition. The relative amount of the surfactant added is based on the amount of the polyamide resin which is to be present in the final dispersion, and on the particular surfactant used. It has been found, however, that optimum results are generally obtained when the surfactant is used in an amount from about 0.5% to about 12.0% by weight, and preferably from about 5.0% to about 10% percent by weight, based on the total weight of the polyamide resin components, i.e., both the acid terminated and amine terminated polyamide resins.

The polyamide resin dispersions can also contain various additives in addition to the above-noted surfactants, such as protective colloids, viscosity modifiers and the like. Some examples are carboxy methyl cellulose, polyvinyl alcohol, polyethylene oxide and the like. The amount of such additives employed can vary in amounts from about 0.5% to about 10% by weight, based on the total weight of both polyamide resins.

As a matter of convenience and efficiency, it has been found most suitable to combine the acid terminated and amine terminated polyamide components and treat them as a single component to be subjected to the various dispersion steps described herein. Of course, it is also possible, and certainly within the scope of the present invention, to treat the acid terminated and amine terminated polyamide components separately, and subject each individually to the above-referenced dispersion steps, with the step of combining the dispersions taking place at some later time. Where this procedure is followed, the percentage amounts of surfactants and additives set out above and based on the total weight of the combined polyamide resins, will be proportionately reduced in order to obtain the percentage amount to be added to each separate polyamide dispersion.

In one method of carrying out this polyamide resin dispersion technique, the liquified polyamide resin, the heated water and the surfactant are blended together in a predetermined ratio while maintaining the temperature of the individual components and the mixture above the melting point of the polyamide resin. In this regard, the equipment utilized in the initial blending step should likewise be heated to appropriate temperatures to prevent the premature deposition of liquified polyamides on the equipment and a cooling of the blend of materials. The molten polyamide resin, the water and the surfactant are blended in ratios such that the resulting mixture of materials will generally contain from about 20% to about 60%, and preferably about 25% to about 40% by weight of the polyamide resin. The mixture is subjected to comminuting forces sufficient to form a finely divided emulsion in which the droplets or particles of the molten polyamide resin have a volume average size distribution of less than about $1\mu$ in diameter, and being mostly from about $0.5\mu$ to about $1\mu$ in diameter. Particle size distribution can be determined by a number of methods, such as sedimentation or laser light scattering techniques. The particular type of apparatus used for applying the comminuting force to the blend of the polyamide resin, water, and surfactant to some extent is a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general it is preferable for process purposes to run the blend through the comminuting equipment for one pass, in that this facilitates the manufacturing process. It should be appreciated, however, that the blend may be sent through the comminuting equipment for a number of passes in order to obtain the smaller size droplets. In general, the smaller the size of the liquid droplets, the more stable will be the resulting dispersions.

The final step in the foregoing polyamide resin dispersion technique concerns cooling down the emulsion to a temperature below the melting point of the polymerized resin so as to cause the finely divided droplets in the emulsion to solidify into finely divided dispersed particles. The cooling is preferably conducted in a relatively rapid fashion so as to prevent coagulation of the particles during that portion of the solidification wherein the droplets become semi-solid and highly adhesive. Cooling of the emulsions prepared at super atmospheric pressures can be rapidly performed by pumping the emulsion through a heat exchanger or the like. Alternatively, or in addition to using a heat exchanger, the cooling can be the result of water evaporation produced by a rapid reduction in the pressure within the processing equipment.

The foregoing polyamide resin dispersion technique is set forth in greater detail in U.S. Pat. No. 5,025,043, the disclosure of which is incorporated herein by reference, in its entirety. This technique will provide stable, non-solvated, aqueous polyamide resin dispersions suitable for use in preparing the stable, non-solvated, aqueous dispersion of the adhesive resin system of the present invention.

Other polyamide resin dispersion techniques that will lead to stable non-solvated aqueous polyamide resin dispersions for use in the adhesive resin compositions of the present invention, are described, for example, in U.S. Pat. No. 5,095,058, the disclosure of which is also incorporated herein by reference, in its entirety. As disclosed therein, aqueous polyamide dispersions having improved stability against phase separation and gelation are achieved by the addition to such dispersions of a water soluble, amphoteric chemical moiety, such as an amino acid, anionic or cationic salts of amino acid, or mixtures thereof, which exhibit dipolar character in aqueous media. In addition to methods for preparing the polyamide resin dispersions as described in the present application, other embodiments utilizing the polyamide resins, stabilizing agents, neutralizing agents and surfactants described in the present application are disclosed in U.S. Pat. No. 5,095,058. In one method described therein, a solid polyamide resin is mixed with water, a neutralizing agent, and an amount of surfactant which will promote emulsification of the polyamide resin in water. The mixture is heated to a temperature at least as high as the resin softening point to form a water-in-oil emulsion which is inverted by adding thereto an effective amount of inversion water in which has been dissolved a dispersion stabilizing amount of glycine. The resulting emulsion of polyamide resin in water is then cooled below the resin's melting point, causing emulsified droplets of the polyamide resin to solidify as finely divided particles which are dispersed uniformly through the aqueous phase.

Polyamide resin dispersions and methods for the manufacture thereof are described in detail in WO 92/16579, published Oct. 1, 1992, the disclosure of which is incorporated herein by reference, in its entirety. The polyamide dispersions disclosed therein also have improved stability against phase separation and gelation. Additionally, they are capable of forming clear, continuous films at ambient or near ambient temperatures.

The dispersions are produced by first forming a water-in-oil emulsion by mixing together at a first temperature the polyamide resin, water, at least one surfactant, at least one co-surfactant, and a neutralizing base, wherein the water and surfactant are present in amounts effective to form the water-in-oil emulsion, the co-surfactant is present in an amount effect to form the aqueous dispersion, the neutralizing base is present in an amount effective to neutralize the required amount of free acid groups in the polyamide resin, and the first temperature is effective to liquify, i.e., render molten the polyamide resin and to maintain the oil phase of the water-in-oil emulsion as a liquid.

The aqueous dispersions are then formed by mixing together at a second temperature the water-in-oil emulsion and a second amount of water effective to form an oil-in-water emulsion. The oil-in-water emulsion is then cooled to a third temperature effective to form the aqueous dispersions. At least one water soluble, dipolar, chemical moiety is added to either the oil-in-water emulsion at the second temperature or to the aqueous dispersion, in an amount effective to enhance the stability of the aqueous dispersion. The chemical moiety, for example, is an amino acid, anionic and cationic salts derived therefrom, or mixtures thereof. Surfactants utilized in processes disclosed in said published application include well known anionic, polar and nonpolar, non-ionic, amphoteric, and cationic surfactants. The co-surfactants employed are preferably alcohols having up to 10 carbon atoms. Additional embodiments of methods for the preparation of the dispersions, as well as more detailed discussions of materials used therein, are found in said published application, which, as already stated, is incorporated herein by reference.

The present invention also contemplates the use of other polyamide resin dispersion techniques known to those skilled in the art, and which would be found by such an artisan to be suitable for producing a stable, non-solvated, aqueous polyamide resin dispersion suitable for use in the adhesive resin systems of the present invention.

When Used with the Epoxy Resin Component

The surfactants which are selected are those which are capable of acting as oil-in-water dispersing agents for the epoxy resin-water mixture. The surfactants include well known anionic, polar and nonpolar nonionics, and cationic surfactants.

A surfactant or combination of surfactants is added to either the molten epoxy resin, or to the water, or to both the epoxy resin and the water, in a predetermined amount. The surfactant or combination of surfactants which are used in this epoxy resin dispersion technique are ones which will promote the emulsification of the molten epoxy resin in the water and will also act to stabilize the final dispersion of the epoxy resin in the water. A number of different types of surfactants can be successfully employed in this technique. The surfactants which are selected are those which are capable of acting as oil-in-water dispersing agents for the epoxy resin-water mixture. The surfactants include well known anionic, polar and nonpolar nonionics, and cationic surfactants.

Preferably, the surfactants employed are of the nonionic type, most preferably the nonionic alkylaryl polyether alcohols such as those commercially available under the name Triton X-207™ and Triton X-405™ from Rohm and Haas Company (Philadelphia, Pa.). Other suitable nonionic surfactants include ethylene oxide propylene oxide block copolymers, such as those described in U.S. Pat. No. 3,945,964, the disclosure of which is incorporated herein in its entirety.

While not all surfactants are suitable for use in the dispersion of epoxy resins, as those skilled in the art will recognize, it is a relatively simple procedure to screen suitable surfactants for such use. It has been found, for example, that the preferred surfactants are those which exhibit outstanding ability to cause the emulsification of the liquified, i.e., molten epoxy resin in the water. These surfactants are also typically highly effective in imparting a long term stability to the final dispersion.

The surfactants as indicated above are added either to the molten epoxy resin or to the water to be used in the dispersion process. The surfactant, however, is preferably added to the water because of the relative ease of addition. The relative amount of the surfactant added is based on the amount of the epoxy resin which is to be present in the final dispersion, and on the particular surfactant used. It has been found, however, that optimum results are obtained when the surfactant is used in an amount from about 1% to about 25% by weight, and preferably 2% to about 10% by weight, based on the weight of the epoxy resin. The epoxy resin dispersions can also contain various additives in addition to the above-noted surfactants, such as protective colloids, viscosity modifiers and the like. Some examples are carboxy methyl cellulose, polyvinyl alcohol, polyethylene oxide and the like. The amount of such additives employed can vary in amounts from about 0.5% to about 10% by weight, based on the weight of the epoxy resin.

In carrying out this epoxy resin dispersion technique, the liquified epoxy resin, the heated water, and the surfactant are blended together in a predetermined ratio while maintaining the temperature of the individual components in the mixture above the melting point of the epoxy resin. In this regard, it is important that the equipment utilized in the blending step likewise be heated to appropriate temperatures to prevent the premature deposition of liquified epoxies on the equipment and a cooling of the blend of materials. The molten epoxy resin, the water and the surfactant are blended in ratios such that the resulting mixture of materials contains epoxy resin in an amount from about 20% to about 60%, and preferably about 40% to about 60% by weight, based on the total weight of the epoxy resin dispersion.

The final step in the foregoing epoxy resin dispersion technique concerns cooling down the emulsion. The cooling is preferably conducted in a relatively rapid fashion so as to prevent coagulation of the particles. Cooling of the emulsions prepared at super-atmospheric pressures can be rapidly performed by pumping the emulsion through a heat exchanger or the like. Alternatively, or in addition to using a heat exchanger, the cooling can be produced by evaporation of the water as a result of a rapid reduction in the pressure which is present in the processing equipment.

The foregoing epoxy resin dispersion technique will provide a stable, non-solvated, aqueous epoxy resin dispersion suitable for use in the adhesive resin systems of the present invention. The present invention also contemplates the use of other epoxy resin dispersion techniques known to those skilled in the art that will lead to a stable, non-solvated, aqueous epoxy resin dispersion suitable for use in the subject epoxy resin and polyamide resin compositions. Epoxy resin dispersions can also be obtained commercially, such as Epi-Rez® W55-5003, Epi-Rez® W60-5520, Epi-Rez® W60-3515, Epi-Rez® 35201, and CMD W50-3519, all available from Shell Chemical (Houston, Tex.); and Daubond 9010 W55, available from Daubert Chemical Co. (Chicago, Ill.).

Several Methods May Be Used in Preparing the Final Curable Adhesive Resin Compositions In one suitable method of preparing the adhesive resin system of the present invention, the non-solvated, aqueous dispersion of a solid epoxy resin having heat and moisture resistance in cured form, and having unreacted epoxy groups, and the non-solvated, aqueous dispersion of a mixture of solid polyamide resins comprising an acid terminated polyamide resin and an amine terminated polyamide resin, are blended together at a temperature below the melting point of said epoxy and polyamide resins in the dispersions. Preferably, blending occurs at a temperature of between about 0° C. to about 100° C., and more preferably between about 50° C. to 100° C. Blending can be carried out in various fashions using techniques readily apparent to those skilled in the art.

A preferred method for preparing an aqueous dispersion of a polyamide/epoxy, thermoplastic-thermoset curable adhesive resin system according to the present invention, comprises the steps of:

(1) preparing a water-in-oil emulsion of polyamide resins, by maintaining a first temperature, sufficiently high to form such water-in-oil emulsion, and blending together:

(a) (i) water sufficient to establish such an emulsion; (ii) a neutralizing base in amount sufficient to neutralize from about 50% to about 100%, on an equivalents basis, of the free acid groups occurring on the acid and amine terminated polyamide resins to be added as (b); and (iii) a surfactant; and (b) a mixture of solid polyamide resins comprising: (i) an acid terminated polyamide resin having an acid number, on average, of from about 10 to about 30, in an amount of from about 20% to about 60% by weight of the total weight of polyamide resin; and (ii) an amine terminated polyamide resin having an amine number, on average, of from about 5 to about 30, in an amount of from about 80% to about 40% by weight of the total weight of polyamide resin;

(2) cooling said emulsion prepared in step (1) to a second temperature and adding water thereto, both together being sufficient to invert said emulsion and produce an oil-in-water emulsion; and (3) cooling said oil-in-water emulsion to a third temperature, followed by blending therewith an aqueous dispersion of a solid epoxy resin having unreacted epoxy groups numbering, on average, between about 2 and about 8; and (4) following cooling to a third temperature, and either before or after addition of the epoxy resin in step (3), adding to said oil-in-water emulsion an aqueous solution of at least one water soluble, dipolar chemical moiety in an amount effective to stabilize said emulsion and provide stability in the resulting adhesive resin system.

Following the preferred method described above for preparing a specific embodiment of the adhesive resin system of the present invention, there is first prepared a water-in-oil emulsion of about 50 g of water KOH, and a surfactant in about 200 g of a suitable polyamide. This emulsion is prepared and maintained at about 160° C., after which it is cooled to about 120° C., which will usually be below the softening point of the polyamide resin. At the same time, from 500 to 700 g of water is added dropwise to the emulsion until it inverts into an oil-in-water emulsion. This emulsion is then further cooled to about 90° C., after which about 1 g of glycine dissolved in a small amount of water is added to the emulsion; followed by the addition of about 18 g of epoxy resin dispersed in about 70 g of water to the oil-in-water emulsion, which is the final product aqueous dispersion comprising the stable adhesive resin system of the present invention.

The adhesive resin system is brought to its cured state essentially as a result of the cross-linking of the epoxy resin and polyamide resin chains, which in turn is produced by the chemical reaction of the unreacted epoxy groups with the unreacted amine groups, primarily of the amine terminated polyamide resin, but to some extent of the acid terminated polyamide resin as well. Varying ratios of epoxy resin component to the total of the two polyamide resin components can be employed, but preferably the initial ratio of unreacted epoxy groups of the epoxy resin to the unreacted amine groups of the two polyamide resin components is greater than about 1:1 and less than about 10:1. It is more preferred if the ratio of unreacted epoxy groups to the total unreacted amine groups is greater than about 1:1 and less than about 5:1. The most preferred ratio of unreacted epoxy groups to the total unreacted amine groups is greater than about 1.5:1 and less than about 4:1. One of the reasons for the stoichiometric excess, as already explained, is the somewhat restricted access which the unreacted epoxy groups have to the free amine groups of the polyamide resins, which are often sterically hindered due to the larger size and predominant amount of the polyamide resin molecules in the adhesive resin system. Other reasons may be found in the polymerization reaction kinetics, in accordance with which not all of the unreacted amine groups and all of the unreacted epoxy groups will be found to have reacted with each other in a cross-linking reaction once the reaction is complete. While a stoichiometric excess of epoxy groups is necessary for these reasons, an excess with regard to the amount of epoxy resin which will actually be able to react with the polyamide resins is also to be avoided, since unreacted epoxy resin serves no beneficial purpose and can actually adversely affect the properties of the adhesive resin system.

As will be appreciated by the person of ordinary skill in this art, a number of other factors also play a role in the curing of the adhesive resin system in accordance with the present invention. For example, it is desirable to cure adhesive resin system of the present invention at elevated temperatures, which have been defined above as being generally in the range of from about 175° to about 325° F., preferably from about 200° to about 300° F., and more preferably from about 225° to about 275° F. Curing times will be commensurate with the temperature elevation, i.e., the higher the temperature, the faster the curing process will proceed. It has been found that pressure is also a desirable adjunct to the elevated temperatures in achieving not only a satisfactory curing of the adhesive resin system into a cured adhesive resin final product, but the establishment of a satisfactory adhesive bond between the two adherends being joined together.

Prior to the application of elevated temperatures and pressures to achieve the curing of the adhesive resin system and the establishment of the adhesive bond, the adhesive resin system of the present invention, which has been applied as an aqueous dispersion to all or any part of either or both of the surfaces of the adherends to be joined together, will have been subjected to drying so that substantially all of the water content of the aqueous dispersion has been removed. It is preferred that from about 95% to about 100%, and more preferably from about 98% to about 100%, and most preferably from about 99% to about 100% of the water content of the aqueous dispersion of the adhesive resin system be removed. This is most conveniently accomplished by drying the adherend, the surface of which is coated with PATENT the aqueous dispersion, in an oven at a moderate temperature, i.e., from about 90° to about 120° F.

What takes place during the imposition of the conditions of elevated temperature and pressure is an integration or coalescence of the stable, discrete particles comprising the various components of the adhesive resin system, whereby said components come in contact with, and thus interact with each other. The elevated temperature speeds this process, as well as accelerating the chemical reactions which are taking place by several orders of magnitude. The application of pressure forces further intermingling of the components. There results within a very short period of time, usually only a few seconds, the cured adhesive resin final product of the present invention.

Since the adhesive resin composition of the present invention is employed to bind together two or more adherends, the role which is played by the elevated temperature and pressure conditions in this context should also be noted. The elevated temperatures will cause the adhesive resin composition to be in a fluid or molten state. The addition of pressure will cause the adhesive resin to envelope, or penetrate into, and thereby become anchored to, the projections, pores, irregularities and interstices of the adherend surface. The spunbonded, non-woven, high-density polyethylene, provides an excellent surface for bonding in this regard, while the polycarbonate surface, being very smooth, presents more of a problem. Here, the elevated temperatures also accelerate the chemical bonding which is taking place between the adhesive resin and the surface of the polycarbonate. Accordingly, the elevated temperatures and pressures are a desired feature of the adhesive bonding methods according to the present invention.

The resulting combined epoxy and polyamide resin dispersions of the present invention provide an adhesive resin system which exhibits exceptional stability to separation or reaction at room temperature for at least six months, and which is capable of forming an adhesive bond at elevated temperatures which, once formed, will maintain its integrity under conditions of sterilization. The polyamide and epoxy resin dispersions prepared in accordance with the present invention do not separate or significantly react with one another when allowed to stand at ambient temperatures, i.e., at room temperature, about 20° C., for six months, preferably nine months, even more preferably one year, and most preferably for more than one year. The extent of this improved stability is indeed surprising, and it has been found that the dispersions prepared in accordance with the present invention typically will be stable over extremely long periods of time, e.g., even in excess of one year. Furthermore, the dispersions of the present invention do not require that the starting polyamide and epoxy resin dispersions be solvated, an improvement which brings with it a number of advantages, as further described herein.

The aqueous dispersion of an adhesive resin system of the present invention, comprising the combined epoxy and polyamide resin dispersions, has further advantages such as the elimination of the need for expensive organic solvents, elimination of organic solvent toxicity and associated fire hazards, less excessive and unnecessary impregnation of the adhesive composition into porous adherend surfaces, more ready handleability, etc. A further advantage of the combined dispersions of the present invention is that once formed, they can be freeze-dried, resulting in a finely divided powder which can be redispersed in water with minimal agitation to reform a stable aqueous dispersion. The excellent stability of the combined dispersions which make up the adhesive resin system of the present invention are further contemplated to be able to undergo repeated freeze-thaw cycles without a resultant breakdown of the dispersion. Of more importance is the excellent stability or shelf life of the combined polyamide and epoxy dispersions.

Of still further importance is the surprising ability of the adhesive resin systems of the present invention to achieve satisfactory adhesive bonding between difficult-to-bond adherends, such as polycarbonate and high density polyethylene, which is obtained almost immediately upon heat sealing of the adhesive resin system to a substrate with readily usable and available equipment and conditions. The adhesive bond thus achieved will then be able to withstand the harsh conditions which characterize sterilization procedures, i.e., high temperatures, humidity and pressures, for significant periods of time, without any appreciable degradation of said adhesive bond.

These surprising properties of the adhesive resin systems of the present invention find ready application to methods of fabricating packaging containers of various types, but especially wherein all or some part of the materials used in said fabrication, have surfaces which are difficult ones on which to establish an adhesive bond. The adhesive resin systems of the present invention find particular advantageous use in fabricating packaging containers for various items to be used in the field of medicine and dentistry, especially surgery, where the item will be used for some invasive procedure and must, consequently, be sterilized in an autoclave. The adhesive bonds which are created in order to fabricate such packaging containers must be able to withstand the high temperature and moisture conditions which prevail in an autoclave. The adhesive resin systems of the present invention not only satisfy this need, but where such difficult-to-bond materials as polycarbonate resins are used to fabricate the packaging containers, the adhesive resin systems of the present invention also find particular application in light of their excellent ability to form an adhesive bond with such materials which will maintain its integrity under the extreme conditions found in an autoclave.

Additives for Contributing Particular Properties to The Final Adhesive Resin Composition May Be Included The adhesive resin system of the present invention can contain, if desired, in addition to the compositions and materials already described, various additives which would be within the ordinary skill of the artisan in this field to select. Examples of such other additives are fillers, reinforcing agents, coupling agents, colorants, odorants, other comonomers, other resins, tackifiers, plasticizers, lubricants, stabilizers, antistatic agents, and the like. In addition, antioxidants can be added at any point during the reaction sequence. One particularly useful type of additive would be one or more stabilizing agents which act by preventing flocculation of the resin particles. Typical stabilizers of this type include water soluble alkali metal salts of polymeric organic acids. Other types of such additional stabilizers would include protective colloids such as lignin derivatives, proteins, water soluble cellulose derivatives, starch, alginic acid, and long chain alcohols and lecithin.

The specific amounts of such additives of the various types described above, including stabilizing agents, which may be included in the adhesive resin system of the present invention, will be well within the ambit of ordinary skill of the artisan in this field to choose, once said artisan is apprised of the details of the present invention disclosed herein. Typically the amounts chosen by such a person of ordinary skill will range from about 0.5% to about 10% by weight, based on the total weight of the adhesive resin system, it being noted that the weight of the cured adhesive resin final product will be substantially less, since the water content of the aqueous dispersion will have been eliminated. Greater or lesser amounts may be employed as necessary, which will be within the skill of the artisan to determine. The aqueous dispersions of the present invention may likewise contain other materials such as viscosity modifiers, and dyes and pigments and the like, all of which would be within the knowledge of the artisan of ordinary skill in adhesive formulations. In this regard, it should be noted that the excellent stability of the adhesive resin systems of the present invention allow substantial loadings of additives without adversely affecting the overall stability thereof.

Chemical curing accelerators may also be present in the adhesive resin systems of the present invention, or in the individual aqueous dispersions which it comprises. Examples of such accelerators include bisphenol A, triphenylphosphite, phenolic resins, imidazole compounds, and the like. Suitable amounts of such curing accelerators to be added will be readily apparent to the person of ordinary skill in this art, once equipped with the knowledge provided by the disclosure herein. By way of general guidance, the amounts of such curing accelerators which it is desirable to add will typically range from about 0.1% to about 2.0% by weight, based on the total weight of the adhesive resin system, although greater or lesser amounts may be employed as necessary.

A number of inert components may also be incorporated in the adhesive resin system of the present invention in amounts that will be apparent to the person of ordinary skill in this art, as long as they do not adversely affect the shelf life of the resultant composition, or its ability to be employed in the particular adhesive end use for which it is intended.

The Adhesive Resin Systems May Be Used In a Variety of Adhesive Applications Numerous adhesive applications are available for the adhesive resin systems of the present invention. The primary uses contemplated for said systems, are those wherein they are applied as aqueous dispersions to the surfaces of adherends to be joined together, are then dried to remove substantially all of their water content, and are subsequently subjected to heat and pressure along with the adherends to create a permanent, thermoset adhesive bond. Thus, the adhesive resin systems of the present invention provide excellent heat seal adhesives. They may be of value as structural adhesives for metal, wood, ceramics, glass and other rigid materials.

It is also contemplated that the adhesive resin systems of the present invention can be added or applied directly as aqueous dispersions, i.e., without subsequent drying before the step of applying heat and pressure to form the permanent, thermoset adhesive bond. While these uses are not anticipated to afford as significant advantages as are obtained with the heat seal adhesive applications described above; nevertheless, they are still within the scope of the present invention. Thus the adhesive resin systems of the present invention may be used as beater or head box adhesives in the preparation of paper, and as protective or decorative coatings of various sorts. They may also be employed in the formulation of water-based paints, and may be utilized in applications involving the fabrication of various manufactured goods from glass fiber filled resins. They may also be used as binders for all sorts of particulate matter including cork, cellulosic materials, resinous materials, paper pulp, wood flour, asbestos fiber, textile fibers, clay, sand, plaster of Paris, pigments, leather, numerous waste materials, and the like. The adhesive resin systems of the present invention also provide excellent impregnants for paper, textiles, leather and other porous surfaces. Where these are later dried, they may be employed in the various above-described heat seal adhesive applications.

The adhesive resin systems of the present invention may be applied to a wide variety of substrates which require an adhesive of high strength, durability and resistance to chemicals and solvents, high temperature and humidity, and other harmful agents. Such substrates are,e.g., polyvinyl, polycarbonate, polystyrene, glass and wood.

The application and curing of the adhesive resin systems of the present invention is effected very simply. The polyamide resins aqueous dispersion with its neutralizing base, and the epoxy resin dispersion, which together comprise the adhesive resin system of the present invention, may be applied separately to all or any part of the surface of one or more of the substrates to be adhesively bonded together; or they may be mixed together and then coated upon one or more of said substrates to be adhesively bonded together. It is essential, however, that during the process of curing at elevated temperatures, that all of the components of the adhesive resin system of the present invention be brought into intimate contact with one another, so that each of their separate contributions to the properties of the adhesive resin system may be realized, and in order that their interactions, which also contribute to the desired properties of the adhesive resin system, may be achieved.

The method for bonding at least a first and second substrate, referred to herein as adherends, comprises the steps of (1) coating all or any part of one surface of the first substrate with the adhesive resin system of the present invention; (2) drying said adhesive coated substrate in order to remove substantially all of the water content from said adhesive; (3) contacting all or any part of the surface of the second substrate to the adhesive coated surface of the first substrate, thereby forming the areas to be joined; and (4) applying elevated temperatures, and preferably pressures, to the areas to be joined, whereby curing of the adhesive resin is accomplished and an adhesive bond is formed between the adherend surfaces in the areas to be joined.

Optionally, the method for bonding of the adherends may be accomplished by (1) applying the polyamide resin aqueous dispersion component to all or any part of one surface of one of the adherends; (2) applying the epoxy resin aqueous dispersion component to all or any part of one surface of the other adherend; (3) drying said adhesive coated substrates in order to remove substantially all of the water content from said adhesive; (4) contacting the adhesive coated surfaces of both adherends, thereby forming the areas to be joined; (5) applying elevated temperatures, and preferably pressures, to the areas to be joined, whereby curing of the adhesive resin is accomplished and an adhesive bond is formed between the adherend surfaces in the areas to be joined. Simultaneously, the combination of the two components, which now forms the adhesive resin system of the present invention, although not as an aqueous dispersion, is both cured at elevated temperatures and made to form the adhesive bond between the adherends by bonding to the surfaces thereof.

The adhesive resin systems of the present invention have particular application to the manufacture of packaging containers used in the health care industry for enclosing and isolating an object to be sterilized by autoclaving. Generally, such a packaging container will comprise a first part for surrounding and holding said object, and having a portion thereof which forms an opening, said first part being made of a polycarbonate resin; and a second part for covering said opening of said first part whereby said object to be sterilized is isolated, made of a non-woven high-density polyethylene; wherein said first and second parts are adhesively bonded to each other under elevated temperature by means of an aqueous dispersion of an adhesive resin system as described above. This application especially includes such a packaging container wherein the object to be sterilized is one to be utilized in an invasive medical or dental procedure, e.g., a surgical instrument.

In a particular embodiment of the present invention, the first part of the medical packaging container is a tray fabricated from polycarbonate, suitable for holding, e.g., various surgical instruments. The rim, i.e., the sides of the tray, are preferably finished with a lip or flange which provides additional surface area on which the adhesive bond will be formed. The tray will usually have a flat bottom, while the opposite side, i.e., the top, defined by the rim, will be completely open. The surgical instrument or other object to be sterilized is then placed in said tray. In order to isolate said object from any external contaminating environment, the opening of said tray is next covered by the second part of the medical packaging container. This covering is simply a sheet of non-woven high-density polyethylene which has been cut to a size and shape that will contact all of the surface of the flange of said tray, whereby said object to be sterilized can be isolated.

The final step in completing the formation of the medical packaging is to adhesively bond the two parts, i.e., the tray and the cover to each other. This is preferably accomplished by having the adhesive resin system of the present invention applied as a uniform coating to the cover of non-woven high-density polyethylene. While a non-uniform or "spot" coating applied only to the areas of the cover which will make contact with the flange of the tray would save on the amount of adhesive resin required, and is certainly within the scope of the present invention, it has been found preferable, in terms of the economics of producing the adhesive-coated cover, to utilize a uniform adhesive coating. When this preferred embodiment is employed, however, care must be taken to adjust the resin concentration of the aqueous dispersion so that the layer of adhesive resin which is finally formed does not block the pores of the non-woven high-density polyethylene. The pores of said cover permit access by the hot air and steam of the autoclave to the interior of the packaging container, and thus to the object to be sterilized.

Once the adhesive resin system, which is an aqueous dispersion, is applied to the cover of non-woven high-density polyethylene, it is next necessary to dry it in order to remove substantially all of the water content of said aqueous dispersion. This is most easily accomplished by placing said cover in an oven at a moderate temperature, i.e., one which will not lead to premature curing of the adhesive resin. Once the adhesive resin coating has been dried, it can be kept for long periods of time before further use, or may be used immediately in the next steps of fabricating the packaging container.

The dried, adhesive resin coated cover is placed on the tray, and is moved into contact with all of the flange surface of said tray. After this is done, heat and pressure are applied by means of any convenient heat sealing device, to the areas to be joined, i.e., the entire flange area surface of the rim of the polycarbonate tray. Only a few seconds of applying this heat and pressure will be sufficient to achieve virtually simultaneous cure of the adhesive resin and bonding together of the two adherends, i.e., the tray and its cover. Any machine of the various types well known in adhesive bonding applications involving the application of heat and pressure, may be used for this purpose, or may be readily adapted for such use by the artisan.

The adhesive resin system of the present invention must be cured at elevated temperatures, preferably with the application of pressure to the first and second substrates after contacting the second substrate to the adhesive coated surface of the first substrate, in order to accomplish the required degree of curing. The curing temperature will generally be in the range of from about 175° to about 325° F., preferably from about 200° to about 300° F., and more preferably, from about 225° to about 275° F. The curing under elevated temperatures also contemplates a range of corresponding curing times which are appropriate and practicable in view of the circumstances under which the adhesive bond is being formed.

It will be appreciated that the higher curing temperatures often permit a corresponding reduction in the amount of curing time required. The curing time which is necessary to provide a stable, heat and moisture resistant bond in accordance with the present invention will generally be in the range of from about 1 sec. to about 1 min., although the shorter curing times are clearly more desirable, and the adhesive resins of the present invention may be satisfactorily cured within about 1 to 10 sec., usually about 2 to 5 sec., and often in about 3 sec.

In addition to elevated temperature and time, the application of pressure is desirable and preferred for the purpose of assuring an adhesive bond which will not fail under sterilization conditions. The amount of pressure which should be applied to achieve this objective will be between about 10 and 100 psi, preferably about 20 to 80 psi, and more preferably from about 40 to 60 psi. It has been found that a pressure of about 50 psi usually provides a sufficient amount of pressure to obtain a good and lasting adhesive bond in accordance with the present invention.

The resultant cured adhesive resin final product, and the adhesive bond formed thereby which joins together the portions of the surfaces of the adherends in the areas to be joined together, is a thermoset resin bond having good initial adhesive strength at room temperature, but also especially maintaining its integrity under the elevated temperature and moisture conditions of sterilization in an autoclave. The term thermoset, as used herein, denotes a material that either will undergo or has undergone a chemical reaction by the action of heat, but also optionally catalysts or other means, leading to a relatively infusible state. Upon curing, the resultant thermoset adhesive composition demonstrates improved organic solvent resistivity, water resistivity and heat resistivity. The thermoplastic-thermoset adhesive of the present invention is more ductile and flexible, provides longer working times, and will bond to most plastics. In addition, the thermoplastic-thermoset adhesive resin systems of the present invention provide improved bonding to substrates having smooth surfaces, which are generally more difficult to bond.

DESCRIPTION OF PREFERRED EMBODIMENTS

The following Examples are given by way of further illustration of the present invention, and should not be construed as limiting the scope of the present invention as set forth in the appended claims. Examination of the examples and resulting data will show that the two-component, curable epoxy/polyamide, thermoplastic-thermoset adhesive resin dispersions of the present invention have significantly improved adhesive properties at elevated temperatures under conditions of sterilization.

EXAMPLE 1

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 140 g of AM14 and 60 g of AC20 were charged to a 2 liter Parr reactor and heated to 160° C. with 500 rpm stirring. An aqueous solution containing 14.3 g of Tergitol NP-40 (70%) (Union Carbide, Danbury, Conn.), 3.0 g potassium hydroxide (85% KOH) and 35 grams of water was added slowly to the molten resin to form an initial water-in-oil emulsion. To invert the emulsion, 559 g of water was heated to 95° C. and added slowly to the initial emulsion, forming an oil-in-water emulsion.

The emulsion of the two polyamide resin components prepared as described above was then blended with 17.1 g of Daubond™ 9010 W55 epoxy resin (Daubert Chemical Co.; (Chicago, Ill.), an aqueous dispersion in 66 g of water at ambient temperature, using a simple paddle mixer. The emulsion was further cooled to 25° C., and then filtered through a 50μ polypropylene bag filter.

Finally, there was added to the dispersion mixture prepared above, 2 g of glycine dissolved in 20 g of water, to obtain a stable, white fluid dispersion of adhesive resin ready for application.

The dispersion had a volume average particle size of 0.5μ, as determined by light scattering, and showed no signs of separation even after high speed centrifugation.

EXAMPLE 2

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 133 g of AM14 and 67 g of AC20 are charged to a 2 liter Parr reactor and heated to 160° C. with 500 rpm stirring. An aqueous solution containing 14.3 g of Tergitol NP-40 (70%) (Union Carbide, Danbury, Conn.), 1.5 g potassium hydroxide (85% KOH) and 50 grams of water is added slowly to the molten resin to form an initial water-in-oil emulsion. The emulsion is then cooled to 120° C.; and then to invert the emulsion, 577 g of water is heated to 95° C. and added slowly to the initial emulsion, forming an oil-in-water emulsion, following which the emulsion is further cooled to 90° C.

There is then added to the emulsion prepared above, 1 g of glycine dissolved in 20 g of water; after which the emulsion of the two polyamide resin components is blended with 17.1 g of Daubond™ 9010 W55 epoxy resin (Daubert Chemical Co.; (Chicago, Ill.), as an aqueous dispersion in 66 g of water at ambient temperature, using a simple paddle mixer. The emulsion is further cooled to 25° C., and then filtered through a 50µ polypropylene bag filter to obtain a stable, white fluid dispersion of adhesive resin ready for application.

The dispersion has a volume average particle size of 0.5µ, as determined by light scattering, and shows no signs of separation even after high speed centrifugation.

EXAMPLE 3

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 133 g of UNI-REZ 2636 AM 14 and 67 g of UNI-REZ AC 20 were charged to a 2 liter Parr reactor and heated to 160° C. with 500 rpm stirring. An aqueous solution containing 14.3 g of Tergitol NP-40 (70%) (Union Carbide, Danbury, Conn.), 3.0 g potassium hydroxide (85% KOH) and 50 grams of water is added slowly to the molten resin to form an initial water-in-oil emulsion. The emulsion is then cooled to 120° C.; and then to invert the emulsion, 577 g of water is heated to 95° C. and added slowly to the initial emulsion, forming an oil-in-water emulsion, following which the emulsion is further cooled to 90° C.

There is then added to the emulsion prepared above, 1 g of glycine dissolved in 20 g of water; after which the emulsion of the two polyamide resin components is blended with 17.1 g of Daubond™ 9010 W55 epoxy resin (Daubert Chemical Co.; (Chicago, Ill.), as an aqueous dispersion in 66 g of water at ambient temperature, using a simple paddle mixer. The emulsion is further cooled to 25° C., and then filtered through a 50µ polypropylene bag filter to obtain a stable, white fluid dispersion of adhesive resin ready for application.

The dispersion has a volume average particle size of 0.5µ, as determined by light scattering, and shows no signs of separation even after high speed centrifugation.

EXAMPLE 4

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 120 g of AM14 and 80 g of AC20 were charged to a 2 liter Parr reactor and heated to 160° C. with 500 rpm stirring. An aqueous solution containing 14.4 g of Tergitol NP-40 (70%) (Union Carbide, Danbury, Conn.), 3.9 g potassium hydroxide (85% KOH) and 35 grams of water was added slowly to the molten resin to form an initial water-in-oil emulsion. The emulsion was then cooled to 120° C.; and then to invert the emulsion, 559 g of water was heated to 95° C. and added slowly to the initial emulsion, forming an oil-in-water emulsion, following which the emulsion was further cooled to 90° C.

The emulsion of the two polyamide resin components prepared as above, was blended with 17.1 g of Daubond™ 9010 W55 epoxy resin (Daubert Chemical Co.; (Chicago, Ill.), as an aqueous dispersion in 66 g of water at ambient temperature, using a simple paddle mixer. There was then added 2 g of glycine dissolved in 20 g of water; after which the emulsion was further cooled to 25° C., and then filtered through a 50µ polypropylene bag filter to obtain a stable, white fluid dispersion of adhesive resin ready for application.

The dispersion had a volume average particle size of 0.5µ, as determined by light scattering, and showed no signs of separation even after high speed centrifugation.

EXAMPLE 5

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 40 g of AM14 and 60 g of AC20 were charged to a 2 liter Parr reactor and heated to 160° C. with 500 rpm stirring. An aqueous solution containing 14.3 g of Tergitol NP-40 (70%) (Union Carbide, Danbury, Conn.), 3.93 g potassium hydroxide (85% KOH) and 36 grams of water was added slowly to the molten resin to form an initial water-in-oil emulsion. The emulsion was then cooled to 120° C.; and then to invert the emulsion, 559 g of water was heated to 95° C. and added slowly to the initial emulsion, forming an oil-in-water emulsion, following which the emulsion was further cooled to 90° C.

The emulsion of the two polyamide resin components prepared as described above was then blended with 17.0 g of EPI-REZ™ W55-5003 epoxy resin (Shell Chemical, Houston, Tex.), an aqueous dispersion in 69 g of water at ambient temperature, using a simple paddle mixer. There was then added to the emulsion prepared above, 2 g of glycine dissolved in 22 g of water; after which the emulsion was further cooled to 25° C., and then filtered through a 50μ polypropylene bag filter to obtain a stable, white fluid dispersion of adhesive resin ready for application.

The dispersion had a volume average particle size of 0.5μ, as determined by light scattering, and showed no signs of separation even after high speed centrifugation.

EXAMPLE 6

A stable, aqueous dispersion of two polyamide resins: a) an amine terminated polyamide with an amine number of approximately 14 (hereafter "AM14"), prepared from approximately one part by weight of non-hydrogenated dimer fatty acid, approximately one-eigth part by weight of azeleic acid, approximately one-sixteenth part by weight of ethylenediamine, approximately one-sixth part by weight of piperazine (65% solids in water), and approximately one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 133 g of AM28 and 67 g of AC20 are charged to a 2 liter Parr reactor and heated to 160° C. with 500 rpm stirring. An aqueous solution containing 10 g of Tergitol NP-40 (70%) (Union Carbide, Danbury, Conn.), 1.2 g potassium hydroxide (85% KOH) and 54 grams of water is added slowly to the molten resin to form an initial water-in-oil emulsion. The emulsion is then cooled to 120° C.; and then to invert the emulsion, 410 g of water is heated to 95° C. and added slowly to the initial emulsion, forming an oil-in-water emulsion, following which the emulsion is further cooled to 90° C.

There is then added to the emulsion prepared above, 1 g of glycine dissolved in 20 g of water; after which the emulsion of the two polyamide resin components is blended with 18.0 g of EPI-REZ™ W55-5003 epoxy resin (Shell Chemical, Houston, TX), an aqueous dispersion at 58% solids in 69 g of water at ambient temperature, using a simple paddle mixer. The emulsion is further cooled to 25° C., and then filtered through a 50μ polypropylene bag filter to obtain a stable, white fluid dispersion of adhesive resin ready for application.

The dispersion has a volume average particle size of 0.5μ, as determined by light scattering, and shows no signs of separation even after high speed centrifugation.

EXAMPLE 7

A stable, aqueous dispersion of two polyamide resins: a) an amine terminated polyamide with an amine number of approximately 28 (hereafter "AM28"), prepared from approximately one part by weight of non-hydrogenated dimer fatty acid, approximately one-seventh part by weight of azeleic acid, approximately one-thirtyseventh part by weight of steric acid, approximately one-twentyfirst part by weight of ethylenediamine, approximately one-ninth part by weight of piperazine (100% solids in water), approximately one-seventeenth part by weight of diethylenetriamine, and approximately one fourth to one-third part by weight of polyethoxylated ethylenediamine; and b) an acid terminated polyamide with an acid number of approximately 20 (hereafter "AC20"), prepared from approximately equal parts by weight, i.e., approximately one part by weight each of hydrogenated and non-hydrogenated dimer fatty acids, approximately one-half part by weight of sebacic acid, approximately one-tenth part by weight of ethylenediamine, and approximately one-third part by weight of piperazine (100% solids in water); was prepared as follows: 100 g of AM28 and 100 g of AC20 are charged to a 2 liter Parr reactor and heated to 160° C. with 500 rpm stirring. An aqueous solution containing 10 g of Tergitol NP-40 (70%) (Union Carbide, Danbury, Conn.), 1.2 g potassium hydroxide (85% KOH) and 54 grams of water is added slowly to the molten resin to form an initial water-in-oil emulsion. The emulsion is then cooled to 120° C.; and then to invert the emulsion, 410 g of water is heated to 95° C. and added slowly to the initial emulsion, forming an oil-in-water emulsion, following which the emulsion is further cooled to 90° C.

There is then added to the emulsion prepared above, 1 g of glycine dissolved in 20 g of water; after which the emulsion of the two polyamide resin components is blended with 18.0 g of EPI-REZ™ W55-5003 epoxy resin (Shell Chemical, Houston, Tex.), an aqueous dispersion at 58% solids in 69 g of water, at ambient temperature, using a simple paddle mixer. The emulsion is further cooled to 25° C., and then filtered through a 50μ polypropylene bag filter to obtain a stable, white fluid dispersion of adhesive resin ready for application.

The dispersion has a volume average particle size of 0.5μ, as determined by light scattering, and shows no signs of separation even after high speed centrifugation.

EXAMPLE 8

The adhesive efficiency and integrity, before and after autoclaving, of the polyamide/epoxy, thermoplastic-thermoset adhesive resin systems of the present invention, can be tested for the particular application where a non-woven high-density polyethylene cover is adhesively bonded to a polycarbonate tray rim which defines the opening thereof. Such a test observes "adhesive transfer" and desirably includes the following procedures:

(1) on a piece of Tyvek® cast a wet film comprising an aqueous dispersion of the curable adhesive resin system of the present invention to be tested;

(2) allow said film to dry;

(3) prepare one inch by two inch coupons of the coated Tyvek® and of uncoated polycarbonate;

(4) overlap a coated ® coupon with an uncoated polycarbonate coupon to give a one inch by one inch laminated overlap area, with the curable adhesive resin system being disposed as a layer between the Tyvek® and polycarbonate layers;

(5) heat seal the overlap area by applying heat and pressure for a given period of time, typical conditions being 275° F., 50 psi, and 3 sec;

(6) test the laminate fabricated in the preceding step for adhesive efficiency and integrity by pulling said laminate apart, and thereafter observing whether any adhesive material remains in a continuous form on the polycarbonate surface of said laminate, and if so, what percentage of the original amount of adhesive thus remains; and (7) prepare another laminate in accordance with the procedures described above, and expose it to autoclave conditions, which will typically be steam at 250° C., 18 psi, and 45 min, within 30 minutes of the heat sealing step and test the adhesive efficiency and integrity, particularly with respect to the autoclave conditions, as described above, determining the percentage of the original amount of adhesive remaining adhered to the polycarbonate surface of the laminate which has been separated.

Immediately below there is particularly pointed out and distinctly claimed what is regarded as being the subject matter of the present invention. Said invention claims are intended to include within their literal scope such equivalents as would be obvious to a person of ordinary skill in this art, especially those which have been be described in detail further above.

I claim:

1. A polyamide/epoxy, thermoplastic, curable adhesive resin system, comprising:

(a) a non-solvated aqueous dispersion of a solid epoxy resin having unreacted epoxy groups numbering, on average, between about 2 and about 8; and (b) a non-solvated aqueous dispersion of a mixture of solid polyamide resins comprising: (i) an acid terminated polyamide resin having an acid number, on average, of from about 10 to about 30, in an amount of from about 20% to about 60% by weight of the total weight of polyamide resin; and (ii) an amine terminated polyamide resin having an amine number, on average, of from about 5 to about 30, in an amount of from about 80% to about 40% by weight of the total weight of polyamide resin; and combined with said mixture of polyamide resins, a neutralizing base in amount sufficient to neutralize from about 50% to about 100%, on an equivalents basis, of the total number of free acid groups occurring on said acid and amine terminated polyamide resin components; AND OPTIONALLY:

(c) at least one water soluble, dipolar chemical moiety in an amount effective to stabilize said aqueous dispersion and provide stability in the overall resin composition; said water soluble, dipolaf chemical moiety comprising one or more members selected from the group consisting of amino acids of the formula:

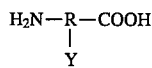

including anionic and cationic salts derived therefrom and mixtures thereof, wherein R is an alkyl, alkenyl, phenyl or phenylalkyl group of one to ten carbon atoms and Y is any polar or non-polar, ionic or non-ionic substituent; AND OPTIONALLY:

(d) at least one surfactant selected from the group consisting of anionic, cationic and non-ionic surfactants; wherein the cured adhesive resin system is resistant to heat and moisture and remains stable upon exposure to a temperature and a humidity associated with autoclave sterilization.

2. An adhesive resin system according to claim 1 comprising at least one water soluble, dipolar chemical moiety in an amount effective to stabilize said aqueous dispersion and provide stability in the overall resin composition.

3. An adhesive resin system according to claim 2 wherein the dipolar chemical moiety is an amino acid which is selected from the group consisting of glycine, and anionic and cationic salts thereof.

4. An adhesive resin system according to claim 1 comprising at least one surfactant selected from the group consisting of anionic, cationic and non-ionic surfactants.

5. An adhesive resin system according to claim 4 wherein the surfactant is nonylphenol polyethoxyethanol.

6. An adhesive resin system according to claim 1 wherein said polyamide resin dispersion and said epoxy resin dispersion each have a resin content of at least about 20% by weight of the total weight of the overall aqueous dispersion composition.

7. An adhesive resin system according to claim 1 wherein said epoxy resin comprises an epoxy novolac resin.

8. An adhesive resin system according to claim 1 wherein the acid terminated polyamide resin has an acid number, on average, of from about 15 to about 25, and comprises from about 30% to about 50% by weight of the total weight of polyamide resin; and the amine terminated polyamide resin has an amine number, on average, of from about 9 to about 16, and comprises from about 70% to about 50% by weight of the total weight of polyamide resin.

9. An adhesive resin system according to claim 8 wherein the neutralizing base is selected as one or more members from the group consisting of the alkali metal and alkaline earth metal hydroxides, and is present in an amount of from about 2.0% to about 8.0% by weight, based on the total weight of acid terminated polyamide in the adhesive resin system.

10. An adhesive resin system according to claim 9 wherein the neutralizing base is present in an amount of from about 3.0% to about 7.0%, by weight, based on the total weight of acid terminated polyamide in the adhesive resin system.

11. An adhesive resin system according to claim 9 wherein the neutralizing base is potassium hydroxide and is present in an amount from about 4.0% to about 6.0% by weight, based on the total weight of the acid terminated polyamide in said adhesive resin system; the water soluble, dipolar chemical moiety is the amino acid glycine; and the surfactant is nonylphenol polyethoxyethanol.

12. An adhesive resin system according to claim 1 wherein the epoxy resin comprises from about 1% to about 20% by weight, based on the total weight of polyamide resins present in the adhesive resin system.

13. An adhesive resin system according to claim 12 wherein the amount of epoxy resin present is from about 4% to about 10% by weight, based on the total weight of polyamide resins present in the adhesive resin system.

14. An adhesive resin system according to claim 1 which exhibits stability at room temperature for at least about six months.

15. An adhesive resin system according to claim 1 which exhibits stability at room temperature for at least about nine months.

16. An adhesive resin according to claim 1 which exhibits stability at room temperature for at least about one year.

17. An adhesive resin system according to claim 1 wherein the length of time after said adhesive resin system is cured at elevated temperatures, until the resulting adhesive resin final product possesses heat and moisture resistance sufficient to withstand the high temperature and high humidity conditions characteristic of autoclave sterilization, is from about 1 to about 10 sec.

18. An adhesive resin system according to claim 17 wherein the length of time is from about 2 to about 5 sec.

19. An adhesive resin system according to claim 1 wherein said elevated temperatures comprise a temperature in the range of from about 175° to about 325° F.

20. An adhesive resin system according to claim 19 wherein said elevated temperatures comprise a temperature in the range of from about 200° to about 300° F.

21. An adhesive resin system according to claim 20 wherein said elevated temperatures comprise a temperature in the range of from about 225° to about 275° F.

22. An adhesive resin system according to claim 1 wherein said conditions of autoclave sterilization comprise temperatures in the range of from about 225° to 300° F.

23. An adhesive resin system according to claim 22 wherein said conditions of autoclave sterilization comprise temperatures in the range of from about 250° to 275° F.

24. An adhesive resin system according to claim 1 wherein said conditions of autoclave sterilization comprise humidity in the range of from about 85% to about 100%.

25. An adhesive resin system according to claim 24 wherein said conditions of autoclave sterilization comprise humidity in the range of from about 95% to about 100%.

26. An adhesive resin system according to claim 1 wherein said aqueous dispersions (a) and (b) can be stored in a freeze-dried form.

27. An adhesive resin system according to claim 26 wherein said freeze-dried form comprises a finely divided powder.

* * * * *

UNITED STATES PATENT AND TRADEMARK OFFICE
CERTIFICATE OF CORRECTION

PATENT NO. : 5,605,944
DATED : Feb. 25, 1997
INVENTOR(S) : Heebner

It is certified that error appears in the above-identified patent and that said Letters Patent is hereby corrected as shown below:

In column 39, claim 1, line 49, please delete "dipolaf" and insert --dipolar-- therefor.

Signed and Sealed this

Fourth Day of November, 1997

Attest:

BRUCE LEHMAN

Attesting Officer

Commissioner of Patents and Trademarks